(12) United States Patent
Jabusch

(10) Patent No.: US 12,397,739 B2
(45) Date of Patent: *Aug. 26, 2025

(54) BELT RETRACTOR

(71) Applicant: Autoliv Development AB, Vargarda (SE)

(72) Inventor: Ronald Jabusch, Elmshorn (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 315 days.

This patent is subject to a terminal disclaimer.

(21) Appl. No.: 18/001,415

(22) PCT Filed: May 27, 2021

(86) PCT No.: PCT/EP2021/064130
§ 371 (c)(1),
(2) Date: Dec. 9, 2022

(87) PCT Pub. No.: WO2021/254756
PCT Pub. Date: Dec. 23, 2021

(65) Prior Publication Data
US 2023/0234533 A1    Jul. 27, 2023

(30) Foreign Application Priority Data

Jun. 18, 2020    (DE) ..................... 10 2020 207 535.2

(51) Int. Cl.
*B60R 22/46*    (2006.01)

(52) U.S. Cl.
CPC ...... *B60R 22/46* (2013.01); *B60R 2022/4666* (2013.01)

(58) Field of Classification Search
CPC ... B60R 22/46; B60R 22/48; B60R 2022/468; B60R 2022/4666
See application file for complete search history.

(56) References Cited

U.S. PATENT DOCUMENTS

| 11,866,000 B2* | 1/2024 | Jabusch .............. B60R 22/3413 |
| 2003/0094326 A1 | 5/2003 | Specht |
| 2005/0011980 A1 | 1/2005 | Prokscha et al. |
| 2005/0173580 A1 | 8/2005 | Lucht et al. |

(Continued)

FOREIGN PATENT DOCUMENTS

| DE | 19927731 A1 | 12/2000 |
| DE | 102005016822 B3 | 1/2007 |
| DE | 102013208148 A1 | 11/2014 |

(Continued)

*Primary Examiner* — Sang K Kim
(74) *Attorney, Agent, or Firm* — DICKINSON WRIGHT PLLC

(57) ABSTRACT

The present invention relates to a belt retractor comprising a belt shaft (5), which is mounted rotatably in a frame (1) and on which a safety belt can be wound, and a force-limiting unit (61) which, when activated, enables a rotational movement of the belt shaft (5) in the extension direction of the safety belt, wherein the force-limiting unit (61) comprises an electric motor (4) and a first blocking device, and the first blocking device is configured to release and again block, in a manner actuated by the activation of the electric motor (4), a rotational movement of the belt shaft (5) in the extension direction in a repeating sequence.

13 Claims, 22 Drawing Sheets

(56) References Cited

U.S. PATENT DOCUMENTS

2009/0222171 A1     9/2009  Jabusch
2013/0256445 A1*   10/2013  Lucht ..................... B60R 22/46
                                                    242/390.8

FOREIGN PATENT DOCUMENTS

| DE | 102018219040 | A1 | 5/2020 |
| EP | 1475282 | A1 | 11/2004 |
| NO | 2015/197172 | A1 | 12/2015 |
| WO | 00/71394 | A1 | 11/2000 |
| WO | 03099619 | A2 | 12/2003 |

* cited by examiner

BELT RETRACTOR

CROSS-REFERENCE TO RELATED APPLICATIONS

This application is a 35 U.S.C. § 371 national phase of PCT International Application No. PCT/EP2021/064130, filed May 27, 2021, which claims the benefit of priority under 35 U.S.C. § 119 to German Patent Application No. 10 2020 207 535.2, filed Jun. 18, 2020, the contents of which are incorporated herein by reference in its entirety.

FIELD

The present invention relates to a belt retractor in a vehicle.

BACKGROUND

Belt retractors have as basic components a load-bearing frame and a belt reel that is rotatably mounted in the frame and onto which a safety belt can be wound. The frame serves not only for mounting the belt reel but also for fastening the belt retractor to a seat structure or to a vehicle structure and, for this purpose, is made of a correspondingly thick steel sheet, which is bent into a U-shaped frame.

Vehicle seats having integrated safety belt devices are known, for example, in the use as front seats in convertibles, in which at least the belt retractors of the safety belt devices are fastened in the backrests of the vehicle seats. In this case, due to the lack of a load-bearing B-pillar and for reasons relating to access to the rear seats or for reasons relating to distance from the rear vehicle structure, the belt retractors are preferably integrated into the backrests of the vehicle seats, which must therefore also be designed to absorb the tensile forces acting in the case of restraint. The belt retractors themselves have all the basic components of a standard belt retractor and are equipped only with various additional subassemblies provided especially for installation in the backrest, such as a self-aligning inertia sensor.

In its basic design, the vehicle seat has a seat structure consisting of several load-bearing structural parts, which serve to fasten the vehicle seat to the vehicle structure. The seat structure is equipped with springs and cushioning in order to improve sitting comfort and is also used for the fastening of further components, such as various seat adjustment mechanisms, including the associated electric motors and further components, such as heating devices, sensors, displays, headrests and the like.

In modern vehicles with autonomous driving systems, there is an increasing demand for greater adjustability of vehicle seats in various orientations and positions in the passenger compartment so that the vehicle occupant can use the freedom obtained by autonomous driving, for example, for more meaningful communication with the other occupants, for extended and more intensive rest phases or even for work, and can orient the vehicle seat accordingly. As a result, the safety belt device, and in particular the belt retractor, no longer has to be fastened to the vehicle structure as heretofore but rather with all components, i.e., belt retractor and belt buckle, to the vehicle seat, as is already the case, for example, with the front seats of convertibles.

Furthermore, in modern safety belt devices, belt retractors are provided with electric motors, which drive the belt shaft upon activation to a reversible belt tightening in the winding direction, for example. The electric motor is likewise fastened to the frame and is arranged laterally of the belt shaft with a drive shaft oriented in parallel to the axis of rotation of the belt shaft. Furthermore, it is known to provide a gear mechanism between the belt shaft and the electric motor, by means of which gear mechanism the rotational speed of the electric motor is translated into a predetermined rotational speed of the belt shaft. The use of the gear mechanism also makes it possible to use an electric motor that is as compact as possible with a high rotational speed and nevertheless exert a comparatively high torque on the belt shaft. However, despite the use of the compact electric motor made possible by the gear mechanism, a belt retractor with an increased installation space requirement is thus produced overall. Such a belt retractor is known, for example, from publication WO 03/0 99 619 A2.

If the belt shaft is to be driven at different rotational speeds and torques, further gear stages must be provided, which further increase the installation space requirement. Such a belt retractor is known, for example, from publication DE 199 27 731 C2.

Furthermore, it is known to provide force-limiting units in the belt retractors, which units enable a force-limited forward displacement of the occupant to reduce the load on the occupant before said load is absorbed by the airbags. In particular, torsion rods made of steel, which are connected with one end in a rotationally fixed manner to a part that can be blocked in a fixed relationship with the vehicle and with the other end to the belt shaft, have proven effective as force-limiting units. During their activation, said torsion bars are plastically twisted about their longitudinal axis and thus deliberately destroy energy. In this case, the force-limiting level or the force-limiting characteristic is determined by the plastic deformation resistance of the torsion bar, which in turn is a function of the material and of the diameter of the torsion bar. The torsion bar provides a constant force-limiting level and is activated only when its plastic deformation limit is exceeded. If the tensile force in the belt is not large enough, for example for restraining smaller children, and the plastic deformation resistance is not exceeded, the occupant, that is to say in this case the child, also does not experience a force-limited forward displacement. In this case, the occupant does not utilize the forward displacement path available for restraint in the passenger compartment and is instead restrained with a greater load on the occupant than would actually be possible with complete utilization of the available forward displacement path.

Furthermore, a frequency-controlled force-limiting unit is known from patent specification DE 10 2005 016 822 B3, which facilitates a force-limited belt extension by means of a mass system that is to be made to vibrate. The advantage of said force-limiting unit can be seen in the fact that the force-limited belt extension is activated independently of the tensile forces acting in the belt, and that the forward displacement path utilized to reduce the load on the occupant is also independent of the severity of the accident. Ideally, therefore, the maximum forward displacement path for the occupant is always utilized and the load on the occupant is maximally reduced. The force-limiting characteristic of said force-limiting unit is defined by the design of the mass system that is to be made to vibrate.

Both the force-limiting unit with the torsion bar and the frequency-controlled force-limiting unit are activated by the tensile force acting in the belt and have an unchangeable force-limiting characteristic defined solely by their design.

SUMMARY

Against this background, the object of the invention is to provide a belt retractor having a force-limiting unit which is intended to enable an improved, controlled belt extension to reduce the load on the occupant.

According to the invention, a belt retractor having the features of Claim 1 is proposed for achieving the object. Further preferred developments can be taken from the dependent claims, the figures and the associated description.

According to the basic idea of the invention, it is proposed that the force-limiting unit in the belt retractor comprises an electric motor and a first blocking device, and the first blocking device is designed to release and to again block a rotational movement of the belt shaft in the extension direction in a repeating sequence by activating the electric motor.

The advantage of the proposed solution can be seen in the fact that the force-limiting unit of the belt retractor has a controllable electric motor, and that the first blocking device is deliberately configured to enable a force-limited belt extension movement triggered by the activation of the electric motor, in that said blocking device releases and again blocks the rotational movement of the belt shaft in the extension direction in a repeating sequence. The beginning and the end of the belt extension movement can thus be controlled independently of the acting tensile forces in the belt. In this case, the rotational movement of the belt shaft before the electric motor is activated is blocked by the blocking device arranged in the blocking position and is only enabled by the activation of the electric motor. The electric motor can also be regarded here as a trigger of the force-limited belt extension movement. As a result of the brief release of the first blocking device, the belt, under the tensile forces exerted by the occupant when restrained during the accident, is extended for a very short period until the next blocking of the first blocking device, and the occupant is displaced forward with a thus reduced load on the occupant, before the blocking again stops the forward displacement, and the process is repeated. The first blocking device is designed such that the time intervals between the unlocking and the subsequent blocking are between 0.01 and 0.05 ms so that the extension of the belt takes place gradually in very short, repeating extension movements, which the occupant, however, does not notice because of the very short time spans.

It is further proposed that the first blocking device can be moved as a function of an activation of the electric motor from a position that blocks the belt shaft into a position that releases the belt shaft, and the first blocking device automatically blocks again as a result of the enabled rotational movement of the belt shaft in the extension direction after a predetermined rotation angle of the belt shaft. According to the proposed development, the electric motor is used to trigger the unlocking operation of the first blocking device and thus to enable the intended belt extension movement by means of a belt shaft released thereby. The subsequent extension movement can be brought about, for example, by the tensile force exerted by the occupant on the belt; the electric motor does not have to contribute here. However, it is not ruled out that the electric motor is also actively used to influence the extension movement. Since the first blocking device is further configured to automatically block again after a predetermined rotation angle of the belt shaft, the rotational movement of the belt shaft in the extension direction is subsequently stopped again automatically before it is released and blocked again in a repeating process.

In this case, the triggering of the unlocking operation of the first blocking device can be realized particularly easily and in a compact design by providing an unlocking ring, which is driven by the electric motor and has a control contour, and by forming the first blocking device by at least one blocking element abutting against the control contour. Due to the shape of its control contour, the unlocking ring controls, by its movement triggered by the drive via the electric motor, the triggering and the course of the movement or the movement potential of the blocking element abutting thereon. In this case, the control contour is designed such that, by virtue of its shape, it pushes the blocking element into the blocking position over certain portions during the movement and releases it deliberately again in certain portions, so that the blocking element can move from the blocking position into a release position and vice versa during the relative movement with respect to the unlocking ring or is forced to move due to the shape of the control contour.

Such a shape of the control contour can be realized, for example, in that it is formed by a ramp structure comprising a number of ramps corresponding to the number of blocking elements and by recesses arranged between the ramps, on which recesses the blocking element abuts alternately in the blocking position and the releasing position. The blocking element is in this case unlocked and blocked by a relative movement of the blocking element(s) with respect to the control contour, which in turn can be triggered by the drive of the unlocking ring via the electric motor with respect to the blocking element(s) and can subsequently be formed by a combination of the movement of the unlocking ring and of the blocking element(s).

It is further proposed that a rotational direction reversing gear is provided, which is in rotary connection with the belt shaft via a first part, and the first blocking device is arranged between the first part of the rotational direction reversing gear and a second part of the rotational direction reversing gear, which is driven by the rotational direction reversing gear into a rotational direction counter to the rotational direction of the belt shaft. As a result of the proposed development, it can always be ensured that the parts, which are blocked with respect to one another via the first blocking device, always perform a relative movement with respect to one another, which in turn is used to automatically block the first blocking device. Furthermore, this relative movement is additionally increased by the rotational direction reversing gear and the resulting different rotational directions of the parts to be blocked with respect to one another. Due to this increased relative movement, the rotation angle of the first part and thus also the rotation angle of the belt shaft, after which the first blocking device is blocked again, can in turn be reduced.

The rotational direction reversing gear can preferably be designed such that the second part performs a rotational movement that is converted by the rotational direction reversing gear into a higher rotational speed, relative to the first part. As a result, the relative rotational movement available for blocking the first blocking device can be further increased and the rotation angle of the belt shaft, after which the belt shaft is blocked again, can be shortened since, as a result, the second part performs a movement which is increased relative to the movement of the first part and thus performs the greater part of the relative movement. Furthermore, the rotational direction reversing gear can be designed such that, in its actual functional direction for tensioning the belt, it can be designed as a gear mechanism stepping down the rotational speed of the electric motor into a lower rotational speed of the belt shaft. Furthermore, the translation of the rotational movement can be advantageous to the extent in that the first blocking device can be realized with comparatively small motor torques.

A particularly compact design of the belt retractor can thereby be realized in that the rotational direction reversing gear is formed by a planetary gear, and the reversal of the rotational direction in the rotational direction reversing gear is realized by a planetary carrier of the planetary gear that is blocked by a second blocking device relative to the frame of the belt retractor. The advantage of this solution is that planetary gears fundamentally have a very compact design and enable high transmission ratios. Furthermore, the planetary gear can have a very simple structural design as a rotational direction reversing gear, in that a planetary carrier is blocked with respect to the frame of the belt retractor. In principle, the planetary gear can thus be used, without blocking the planetary carrier, for example for implementing a further function, such as a reversible pretensioning, to translate the rotational movement of the drive without reversing the rotational direction of the rotational movement.

It is further proposed that the first part or the second part of the rotational direction reversing gear comprises a blocking contour against which the first blocking device abuts in the blocking position. Here, the blocking contour forms a form-fitting connection with respect to the rotational direction of the two parts relative to one another and prevents the further rotational movement of the second part with respect to the first part. The blocking contour is arranged in such a way that the first blocking device comes to rest automatically thereon during the rotational movement of the first part or also of the belt shaft in the extension direction of the belt and blocks the further rotational movement.

It is further proposed that the first part is formed by a tubular, axial extension, which is non-rotatably connected to the belt shaft and forms the housing of the rotational direction reversing gear. The first part practically forms a tubular extension of the belt shaft in the axial direction, which forms a shoulder for blocking the belt shaft and, by virtue of its shape, at the same time, serves as a housing for the rotational direction reversing gear.

In this case, the blocking contour can preferably be formed by ramps, which are directed in the circumferential direction and are arranged on the inside of the annular extension and against which the blocking elements abut in the blocking position. The proposed shape has the advantage that, on the one hand, the ramps enable a positive entrainment of the first part when the first blocking device is in the blocking position. On the other hand, due to their inclines, the ramps enable an automatic displacement of the blocking device from the blocking position into the releasing position when the first blocking device is no longer pushed in the direction of the blocking position by the control contour of the unlocking ring. The blocking contour therefore serves not only to block the first blocking device but additionally also to trigger the unblocking movement when the first blocking device is released.

It is further proposed that the unlocking ring is spring-loaded with respect to the belt shaft via a spring. As a result of the proposed solution, the unlocking ring is held in a resilient connection to the belt shaft and thereby rotates with the belt shaft so that it is held by the spring in a position relative to the belt shaft in which it pushes the blocking device in the blocking position.

It is further proposed that by a mainspring supported fixedly on the frame, the belt shaft is spring-loaded in the winding direction of the safety belt, and the spring force of the mainspring is smaller than the spring force of the spring which loads the unlocking ring. As a result of the proposed development, the electric motor can in addition be used to realize a comfort function by additionally acting on the belt shaft parallel to the mainspring when the safety belt is being worn, thereby either increasing the retraction force acting on the belt shaft, for example for sporty driving, or also to reduce the retraction force acting on the safety belt so that the occupant is less aware of the safety belt. Furthermore, the safety belt can thus also be wound up into the parking position after being unbuckled.

BRIEF DESCRIPTION OF THE DRAWINGS

The invention is explained below using preferred embodiments with reference to the accompanying figures. The following are shown.

DETAILED DESCRIPTION

Figure 1:
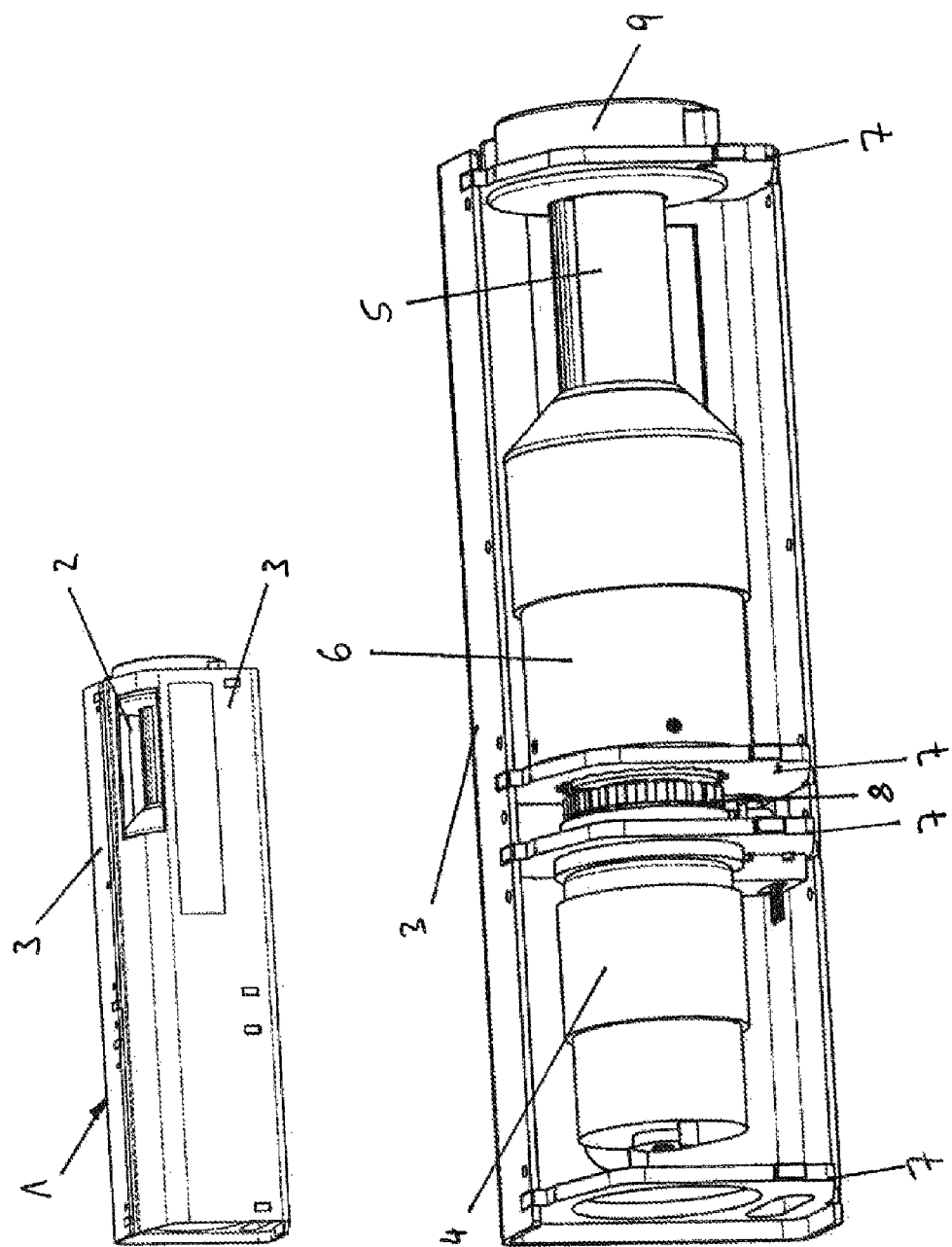
FIG. 1 a belt retractor according to the invention in two representations with a mounted and a partially dismantled frame, and FIG. 2 a belt retractor according to the invention with the individual assemblies in a dismantled state, and FIG. 3 an exploded view of a belt retractor according to the invention without a frame, and FIG. 4 an exploded view of a planetary gear and a force-limiting unit of the belt retractor according to the invention without an electric motor, and FIG. 5 a sectional view of a belt retractor according to the invention, and FIG. 6 the cut-away planetary gear with the force-limiting unit as an assembly, and FIG. 7 the housing of the gear mechanism with the assembly of the force-limiting unit in a first exploded view, and FIG. 8 the housing of the gear mechanism with the assembly of the force-limiting unit in a second exploded view, and FIG. 9 an enlarged sectional view of the planetary gear with the force-limiting unit with different sectional directions, and FIG. 10 a sectional view of FIG. 9 in the sectional direction A-A with a closed coupling arranged between the housing and the gear mechanism during the winding into the parking position, and FIG. 11 a sectional view of FIG. 9 in the sectional directions B-B, C-C and D-D before activation of the force-limiting unit, and FIG. 12 a sectional view of FIG. 9 in the sectional directions B-B, C-C and D-D during activation of the force-limiting unit in a first position, and FIG. 13 a sectional view of FIG. 9 in the sectional directions B-B, C-C and D-D during activation of the force-limiting unit in a second position, and FIG. 14 a sectional view of FIG. 9 in the sectional directions B-B, C-C, and D-D during the activation of a safety belt reminder, and FIG. 15 the drive wheel with a spring and two spring-loaded pawls with the unlocking ring as an assembly according to a second embodiment, and FIG. 16 the drive wheel with the unlocking ring from FIG. 15 in an exploded view, and FIG. 17 a sectional view of the second exemplary embodiment through the drive wheel in the sectional direction D-D during the winding into the parking position, and FIG. 18 a sectional view of the belt retractor with a drive wheel according to FIG. 15 in the sectional directions B-B, C-C and D-D in an initial phase of activation of the reversible belt tightening, and FIG. 19 a sectional view of the belt retractor with a drive wheel according to FIG. 15 in the sectional directions B-B, C-C and D-D in a later phase of activation of the reversible belt tensioning, and FIG. 20 a sectional view of the belt retractor with a drive wheel according to FIG. 15 in the sectional directions B-B, C-C and D-D in an initial phase of activation of the force-limiting unit, and FIG. 21 a sectional view of the belt retractor with a drive wheel according to FIG. 15 in the sectional directions B-B, C-C and D-D in a subsequent phase of activation of the force-limiting unit, and FIG. 22 a sectional view of the belt retractor with a drive wheel according to FIG. 15 in the sectional directions B-B, C-C, and D-D during the activation of a safety belt reminder.
Figure 2:
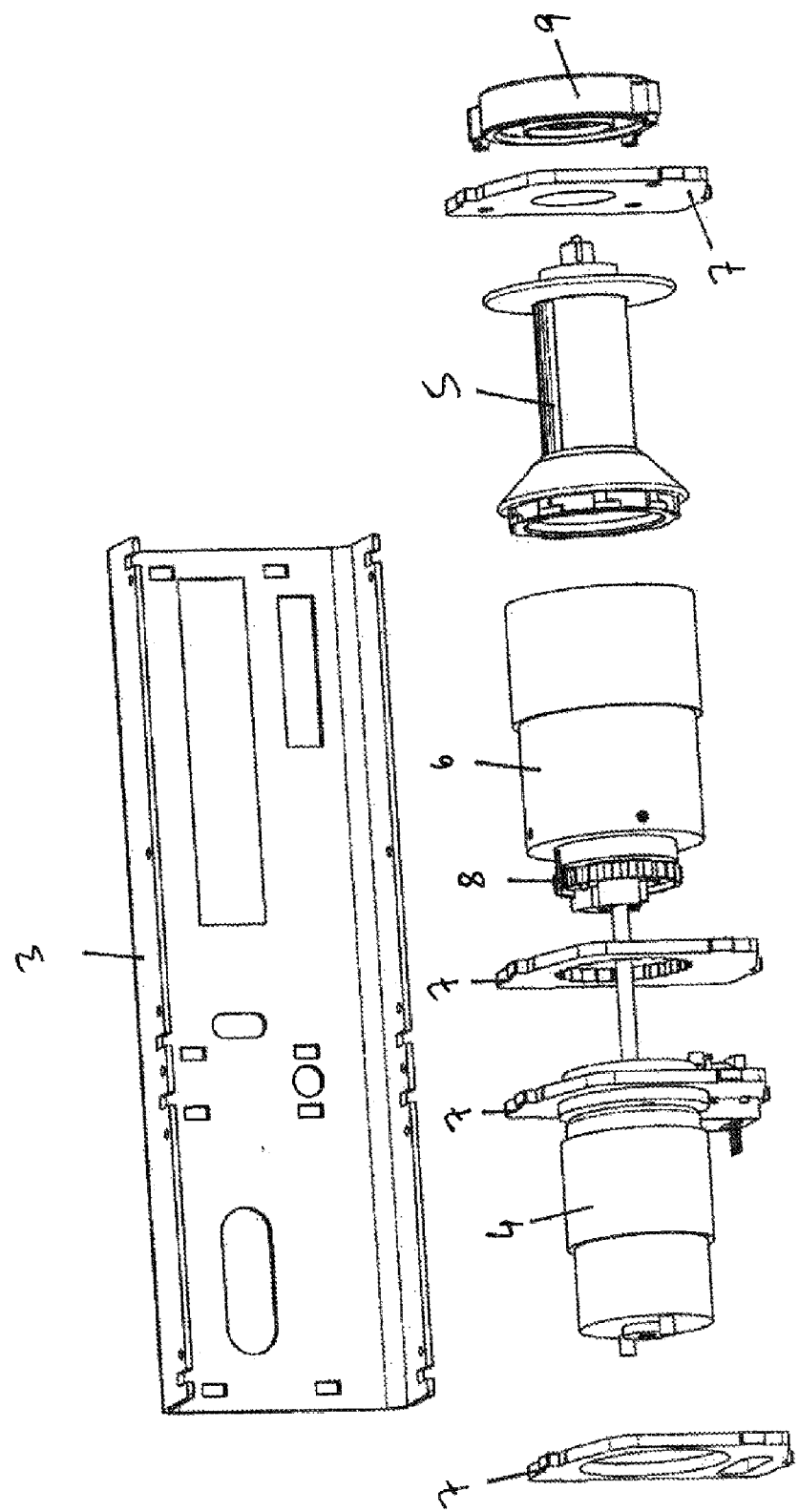

FIGS. 1 and 2 show a belt retractor according to the invention, which has an elongate tubular frame 1 which consists of two housing shells 3 and the basic design of which is rectangular in cross section, with the exception of rounded portions and some inclines. The frame 1 has a slot 2, from which a safety belt (not shown) is guided out onto an occupant restrained by the safety belt in a vehicle. One of the housing shells 3 has been omitted in the bottom illustration in FIG. 1 and in FIG. 2 so that the assemblies of the belt retractor can be seen better. In its elongate form, the belt retractor is designed specifically to be arranged in a vehicle seat, wherein the belt retractor has as small a height and width as possible in cross section as a result of a coaxial arrangement of the assemblies described below, so that it can also be arranged in narrow cavities of the vehicle seat. The frame 1 is divided by a plurality of webs 7 and closed at its ends, wherein the webs 7 brace the frame 1 on the one hand and on the other hand serve to mount or hold the assemblies.

The belt retractor has a belt shaft 5 on which the safety belt (not shown) can be wound. Furthermore, a spring cassette 9 is attached to the outside of the right web 7 in the illustration and, as explained in more detail below, is connected to the right side of the belt shaft 5 in the illustration. The belt shaft 5 is furthermore connected at its left side to a gear mechanism 6 and via it is mounted on a further web 7. Furthermore, a locking unit 8 and an electric motor 4 are provided in a coaxial arrangement with respect to the belt shaft 5 and the gear mechanism 6. During normal operation of the belt retractor, that is to say when the safety belt is in the process of being fastened, being worn and being unbuckled, when the electric motor 4 is not activated, the assembly consisting of the belt shaft 5 and the gear mechanism 6 forms an assembly that is pretensioned in the winding direction by the mainspring 91 of the spring cassette 9 which can be seen in FIG. 3. Furthermore, the assembly consisting of the belt shaft 5 and the gear mechanism 6 can be blocked via the locking unit 8 in the extension direction when predetermined limit values of the belt extension acceleration and/or vehicle deceleration are exceeded.

Figure 3:
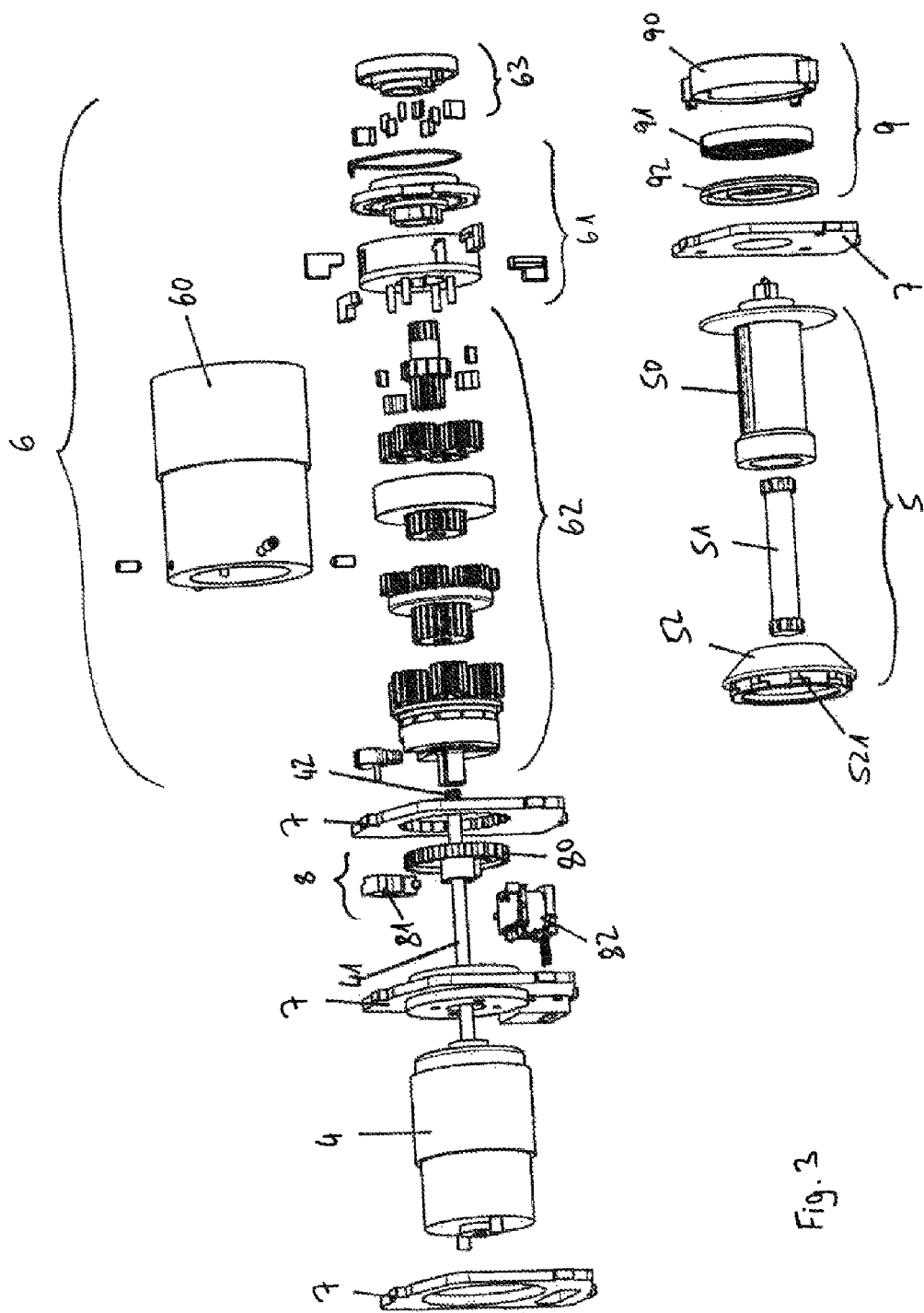

FIG. 3 shows an exploded view of the belt retractor without the frame 1 with its individual parts. Furthermore, the belt retractor can be seen in a sectional view with one of the housing shells 3 in FIG. 5. The spring cassette 9 comprises a housing 90 in which the mainspring 91 is arranged and fastened with its outer end. The open side of the housing 90 is closed by means of a housing cover 92 so that the spring cassette 9 can be prefabricated as an assembly and fastened via the housing 90 to the outside of the right and first web 7. The belt shaft 5 has a two-part construction with a belt shaft body 50 and an end-face radial flange 52, which are connected to one another via a torsion bar 51. The torsion bar 51 is designed here with a very high force-limiting level of, for example, 7 or 9 kN or more and is used here only as overload protection, so is not activated during normal use or in the case of accident scenarios. If the overload protection is to be dispensed with, the torsion bar 51 can also be omitted; it is irrelevant in any case for functions enabled by the electric motor 4. Furthermore, the belt shaft body 50 projects with an extension into the spring cassette 9 and is connected therein via a spring heart to the mainspring 91.

Arranged on the left side of the belt shaft 5 is the gear mechanism 6 which, with a gear mechanism housing 60, is connected in a rotationally fixed manner to the radial flange 52 of the belt shaft 5 via a bayonet connection. The bayonet connection is realized here by correspondingly shaped fingers 521 on the radial flange 52 and recesses 603 on the gear mechanism housing 60, which are of corresponding shape and can be seen in FIG. 4. The gear mechanism 6 comprises a planetary gear 62, a force-limiting unit 61, which is explained in more detail below, a drive wheel 63, which is connected to the drive shaft 41 of the electric motor 4 in a rotationally fixed manner, and a plurality of spring-loaded blocking parts 64, which can be seen, for example, in FIG. 4.

The assembly consisting of the gear mechanism 6 and the belt shaft 5 is mounted at its left side on a second web 7 and extends through an opening of the second web 7 having internal toothing. Furthermore, a further third web 7, on which the electric motor 4 is held, is provided to form an intermediate space. The locking unit 8 is arranged in the intermediate space between the second and the third web 7. The locking unit 8 comprises an electrically actuatable actuator 82 which is held on the same web 7 on which the electric motor 4 is also fastened. Furthermore, the locking unit 8 comprises a control disk 80, which has external toothing and is rotatably mounted on an extension of the gear mechanism 6, and a first blocking pawl 81 which can be actuated by a belt extension acceleration sensor. The control disk 80 comprises a control contour in which a second blocking pawl 6211 engages with a control pin, which pawl is mounted on a first planetary carrier 621a explained in more detail below. The second blocking pawl 6211 here forms the second blocking device, the function of which is explained in more detail below.

In the event of the locking unit 8 being actuated, the actuator 82 is energized and a lever of the actuator 82 is thereby deflected. As a result, the lever of the actuator 82 is directed into the toothing of the control disk 80, which is subsequently stopped with respect to the belt shaft 5 in relation to a further rotational movement in the extension direction of the safety belt and forces the second blocking pawl 6211 into a movement, during which it engages in an internal toothing 71 of the web 7, thereby blocking the belt shaft 5 in the extension direction. Furthermore, the locking unit 8 comprises an AC blocking pawl 81 which, when a predetermined belt extension acceleration is exceeded, is directed into a toothing and thereby blocks the control disk 8 against further rotational movement in the belt extension direction and, as a result, forces the second blocking pawl 6211 in the same way into the actuating movement. Finally, a fourth and last web 7, which closes and braces the frame 1 at the left side thereof, is provided on the left side of the belt retractor. However, the fourth web 7 can additionally also be used for further mounting of the electric motor 4.

Figure 4:
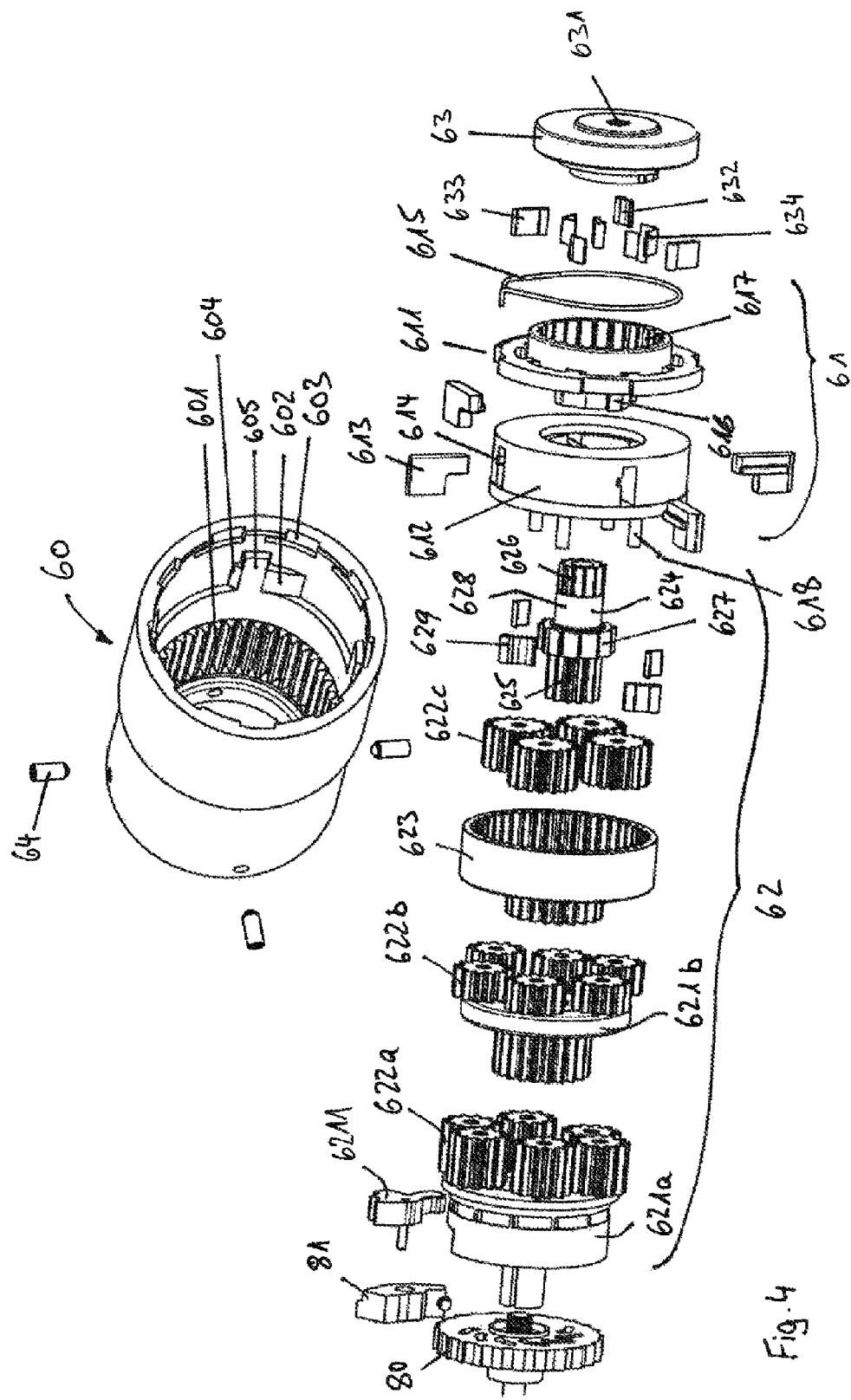

FIG. 4 shows the gear mechanism 6 in an enlarged exploded view. The planetary gear 62 comprises a first planetary carrier 621a having a plurality of first planet gears 622a rotatably mounted thereon and the blocking pawl 6211 pivotably mounted thereon, which forms the second blocking device. Furthermore, the planetary gear 62 comprises a second planetary carrier 621b, which has, on one side, a sun gear meshing radially inward with the first planet gears 622a of the first planetary carrier 621a and, on the other side, a plurality of rotatably mounted second planet gears 622b. Furthermore, an internally toothed ring gear 623 is provided, which has a sun gear on one side, which meshes radially inward with the second planet gears 622b of the second planetary carrier 621b. A set of further third planet gears 622c, which in turn are rotatably mounted on pins 618 projecting axially from a carrier part 612 of the force-limiting unit 61, engage in the internal toothing of the ring gear 623.

The first planet gears 622a of the first planetary carrier 621a mesh in an internal toothing 601 of the housing 60 and thereby establish a connection of the belt shaft 5 to the planetary gear 62. Furthermore, the planetary gear 62 comprises a gear shaft 624, which is mounted rotatably on a drive shaft 41 of the electric motor 4 and which, at its first end, engages radially inward with a first toothing 625 in the toothings of the third planet gears 622c of the planetary stage of the planetary gear 62 on the right of the illustration. Furthermore, the gear shaft 624 has a central second oblique toothing 627 on a larger diameter, a ring section 628, which is arranged next to the second toothing 627 and has a smooth surface, and a third likewise oblique toothing 626 at the second end.

Figure 6:
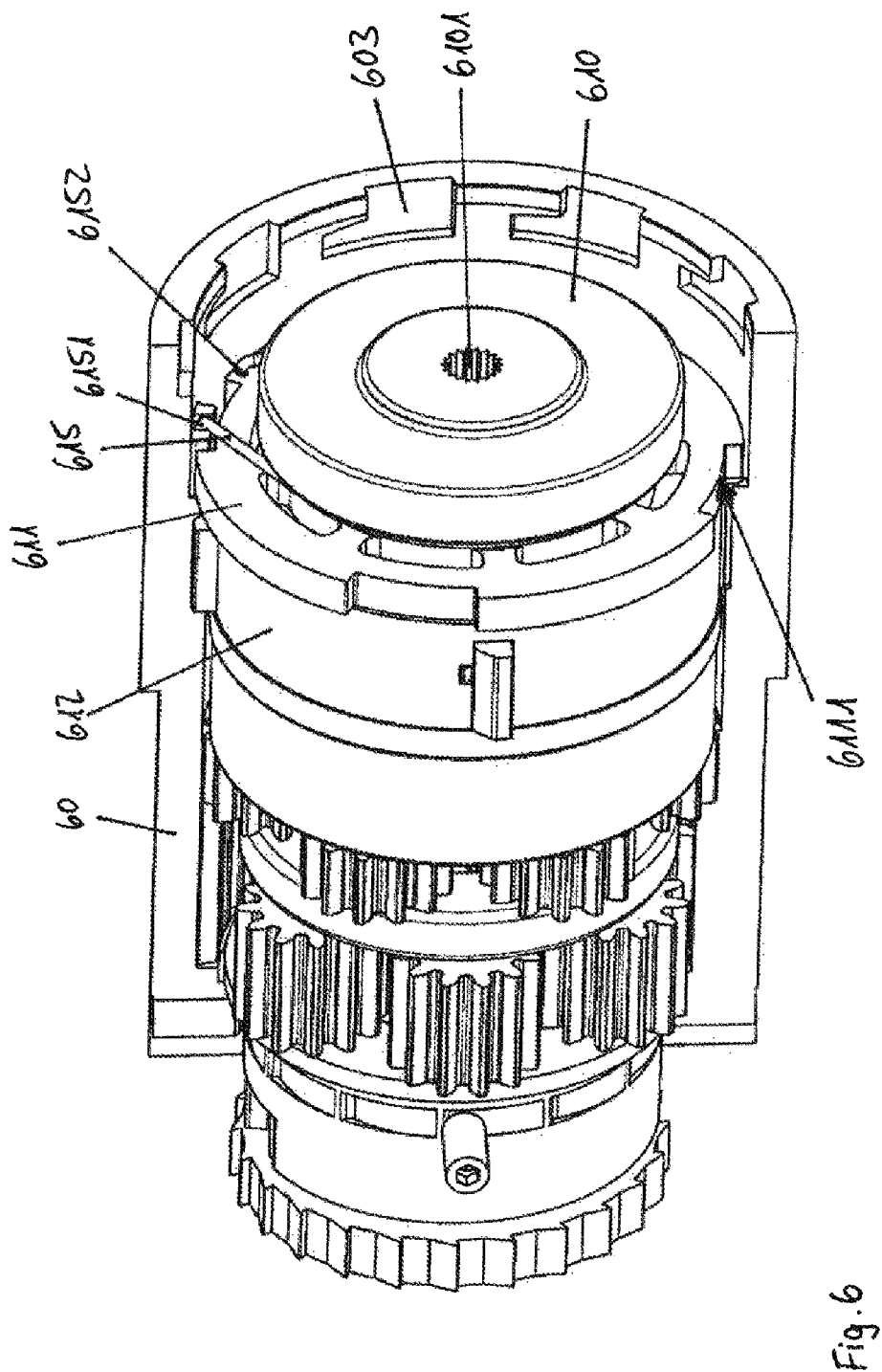

The force-limiting unit 61 comprises an unlocking ring 611 having a control contour 616, which is directed radially outward and provided on one side on an axially projecting annular flange, and an annular flange projecting on the other side and having a radially directed internal toothing 617. The unlocking ring 611 is connected to a first end 6152 of a spring 615, which can be seen in FIG. 6 and which in turn is connected with the second end 6151 to the housing 60 of the gear mechanism 6 and via it to the belt shaft 5. Furthermore, the force-limiting unit 61 comprises the annular carrier part 612 with the axially projecting pins 618, on which the third planet gears 622c of the last planetary stage of the planetary gear 62 in the illustration are rotatably mounted. Furthermore, the carrier part 612 comprises a plurality of slot-shaped, radially directed recesses 614, in each of which a plate-like blocking element 613 is radially displaceably received.

Figure 7:
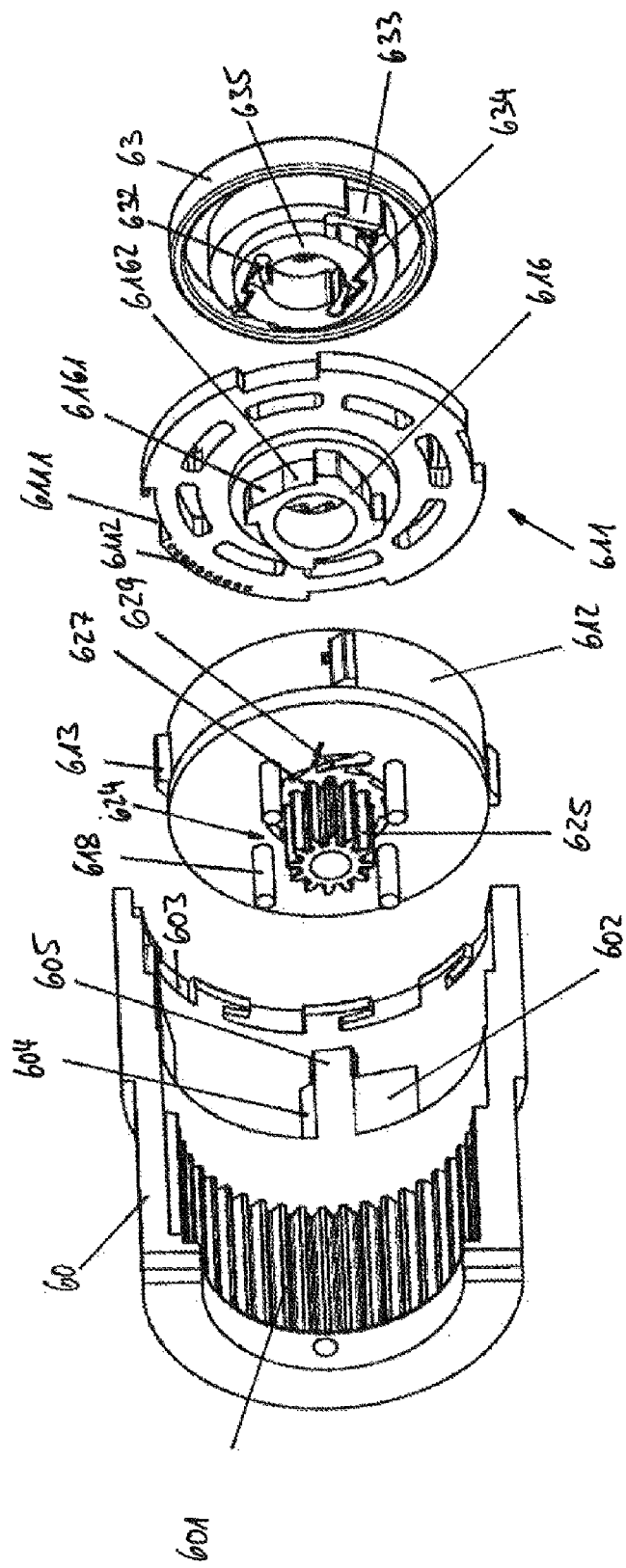
Figure 8:
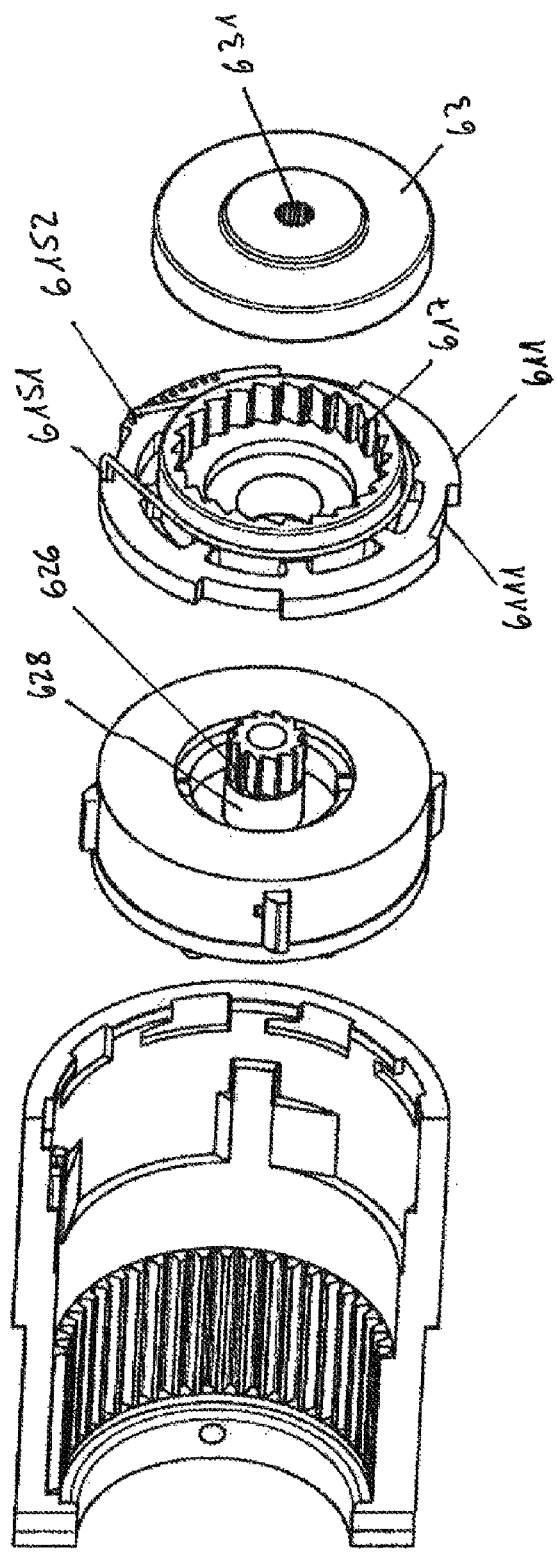

FIGS. 7 and 8 show the carrier part 612 with the gear shaft 624 inserted. The gear shaft 624 projects with the first end and the first toothing 625 arranged thereon in the axial direction from the carrier part 612 and engages with this first toothing 625 between the third planet gears 622c of the right and third planetary stage of the planetary gear 62. In terms of diameter, width and arrangement on the gear shaft 624, the second toothing 627 is designed so as to be arranged in an opening of the carrier part 612. Two spring-loaded parking pawls 629 are also pivotably mounted in the opening of the carrier part 612, wherein the parking pawls 629 are pushed in the engagement direction into the second oblique toothing 627 by means of the spring load On the side facing the carrier part 612, the unlocking ring 611 has the annular flange with the control contour 616 arranged thereon, which is formed by alternately arranged ramps 6161 and recesses 6162. Furthermore, on its radial outer side, the unlocking ring 611 comprises regularly arranged cutouts 6111 and one or more openings 6112 in the radial webs arranged between the cutouts 6111, wherein the spring 615 is fixed with the first end 6152 in one of the openings 6112. The spring 615 is designed as an annular spring and is designed to be substantially stronger in terms of the spring force than the mainspring 91 in the spring cassette 9. Furthermore, the spring 615 is dimensioned and connected to the unlocking ring 611 and the housing 60 in such a way that, in the unloaded state, that is to say in the mounted state, before the electric motor 4 is activated, it fixes the unlocking ring 611 in a position in which the blocking elements 613 are supported radially inward by the ramps 6161 of the control contour 616 of the unlocking ring 611.

The drive wheel 63 has a central axial opening with an internal toothing 631 in which the electric motor 4 is connected in a rotationally fixed manner to its drive shaft 41 (shown in FIG. 3) via a toothed end 42. The drive wheel 63 and the drive shaft 41 thus form a rotationally fixed connection. An annular flange 635, which projects axially in the direction of the unlocking ring 611, is provided on the drive wheel 63, said annular flange being a carrier of two diametrically arranged, radially inward projecting, pivotally mounted first pawls 632, and two diametrically arranged, radially outward projecting, pivotally mounted second pawls 633. The first and second pawls 632 and 633 are spring-loaded by two spring plates 634 held in the annular flange 635, in a position pivoted away from the annular flange 635. The radially inner first pawls 632 are thereby pushed into the third outer toothing 626 of the gear shaft 624. The first pawls 632 and the third toothing 626 are oriented in such a way that a rotational movement of the drive wheel 63 in the winding direction (arrow direction B in FIG. 11, sectional direction D-D) of the safety belt is transmitted to the gear shaft 624. This rotational movement of the gear shaft 624 is then transmitted via the first toothing 625 to the third planet gears 622c of the right planetary stage in the illustration of FIG. 9.

Figure 9:
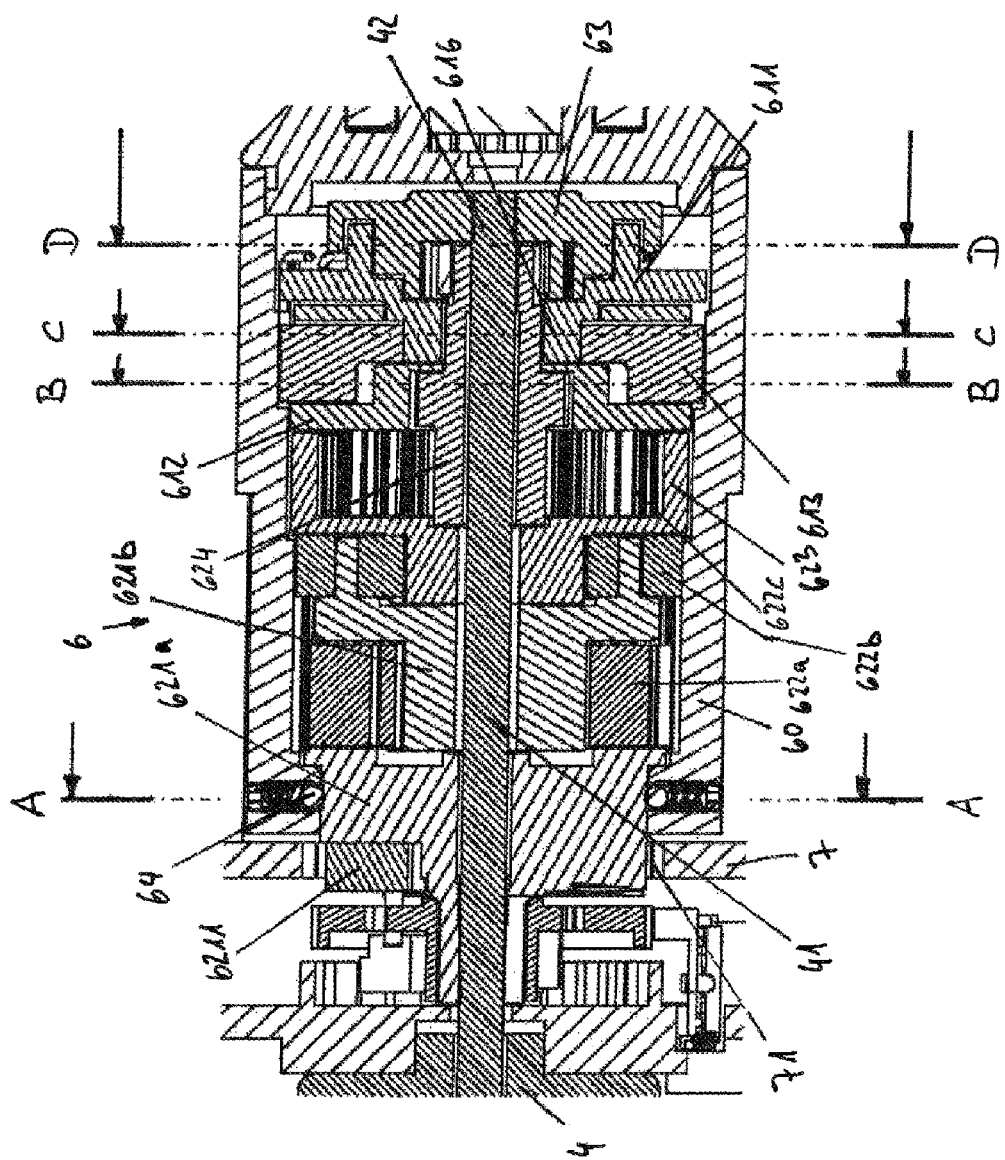

In FIG. 9, the gear mechanism 6 can be seen in an enlarged sectional view with different sectional directions. The drive shaft 41 of the electric motor 4 extends through the gear mechanism 6 and drives the gear mechanism 6 via the drive wheel 63. The rotational movement of the drive shaft 41 is then transmitted from the drive wheel 63 via the force-limiting unit 61, the planetary gear 62 and finally the housing 60 to the belt shaft 5 in different functions, which are explained in more detail below.

Figure 10:
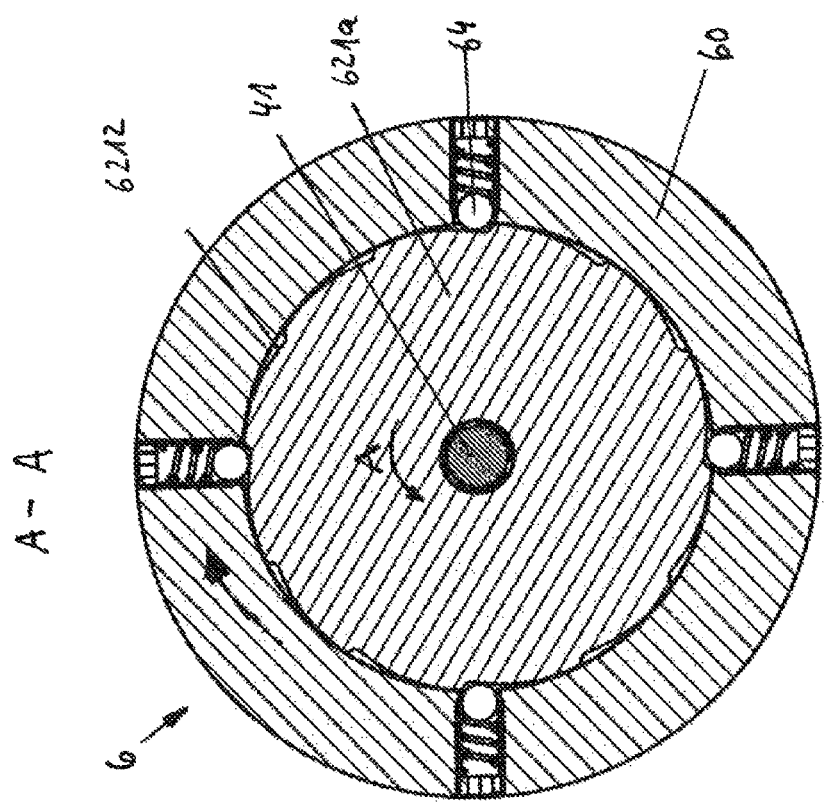

The gear mechanism 6 is visible in sectional direction A-A in FIG. 10. The drive shaft 41 extends through the first planetary carrier 621a, wherein the first planetary carrier 621a can rotate freely relative to the drive shaft 41. Furthermore, the first planetary carrier 621a is connected to the housing 60 of the gear mechanism 6 in a rotationally fixed manner in the rotational direction A counterclockwise in the winding direction of the safety belt via a latching contour 6212 and the spherical, spring-loaded blocking parts 64 engaging therein, until a torque defined by the spring pretensioning of the blocking parts 64 is reached. By means of this thus created rotary connection of the planetary gear 62 to the housing 60, the planetary gear 62 is simultaneously connected to the belt shaft 5. As a result of said rotary connection, when the electric motor 4 is activated with a drive rotational movement of the drive shaft 41 via the drive wheel 63, the gear shaft 624, the planetary gear 62 and finally via the housing 60 of the gear mechanism 6 in the winding direction in the direction of arrow A of the safety belt wound on the belt shaft 5, the belt shaft 5 can be wound into the parking position to roll up the safety belt after it has been unbuckled. For this purpose, the drive rotational movement of the drive shaft 41 of the electric motor is transmitted via the drive wheel 63 to the gear shaft 624 via the first pawls 632 which are mounted on the drive wheel 63 and engage in the third toothing 626. In this case, the first pawls 632 and the oblique third toothing 626 are oriented such that the rotational movement is transmitted in this rotational direction but not in the other rotational direction.

The electric motor 4 acts in this function as a winding aid for the safety belt. The force-limiting unit 61 together with the planetary gear 62 and the housing 60 as an assembly is driven by the drive wheel 63 in a transmission ratio of the rotational movement of the drive shaft 41 of 1:1. Since the planetary gear 62 has a predetermined stiffness, said rotational movement of the gear shaft 624 is transmitted to the housing 60 during the winding movement of the safety belt into the parking position 1:1 via the spring-loaded blocking parts 64 without activation of the planetary gear 62. If the blocking parts 64 are pretensioned with a sufficiently high spring force, a predetermined stiffness of the planetary gear 62 can also be dispensed with. In this case, the drive shaft 41, the drive wheel 63, the gear shaft 624, the housing 60 and finally the belt shaft 5 rotate at an identical speed in the winding direction of the safety belt.

Figure 11:
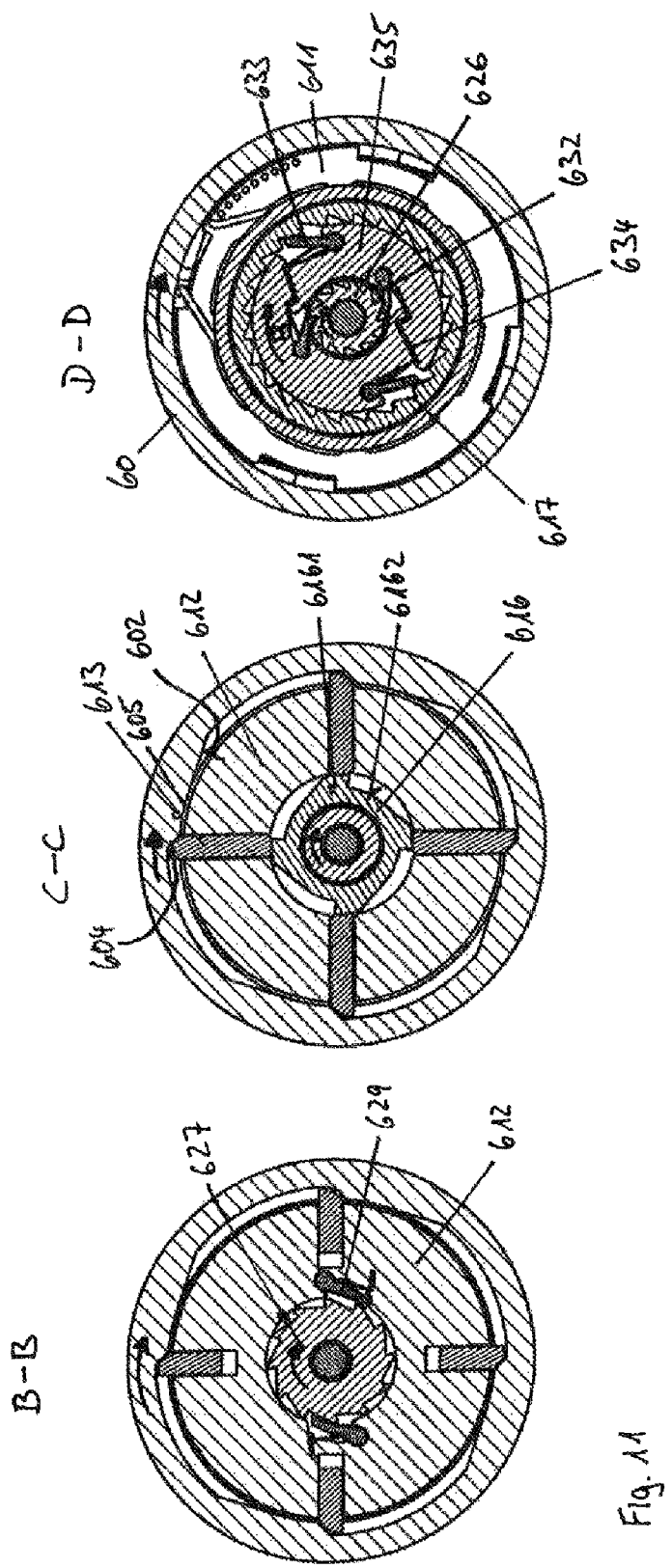

Furthermore, the belt retractor enables a reversible belt tensioning with a higher retraction force in the safety belt for eliminating possible belt slack in a pre-accident or early-accident phase in the drive rotational direction of the electric motor 4 in the sectional views of FIG. 11. For this purpose, the electric motor 4 initially drives the belt shaft 5 in an identical drive rotational movement via the drive wheel 63, in the same force transmission path as in the function as a winding aid in the winding direction in the arrow direction B, but at a very much higher rotational speed. In this case, the belt slack is eliminated abruptly until the belt force to be overcome in the safety belt has increased to such an extent that it is greater than the self-locking in the planetary gear 62 and/or the spring pretensioning of the blocking parts 64. This increase in the belt force leads to the housing 60 of the gear mechanism 6 no longer being able to rotate further and the internal toothing 601 becoming a stationary toothing. In this phase, the planetary gear 62 briefly becomes a rotational direction reversing gear and the first planetary carrier 621*a* is driven by the first planet gears 622*a* rolling on the stationary internal toothing 601 to a rotational movement in the extension direction of the safety belt. At the same time, in addition to the abrupt increase in the rotational speed of the electric motor 4 for activating the reversible belt tensioning, the locking unit 8 is also activated and the lever of the actuator 82 engages in the toothing of the control disk 80 so that the control disk 80 is blocked against rotation in the extension direction of the safety belt. The second blocking pawl 6211 mounted on the first planetary carrier 621*a* engages with a pin in a bean-shaped control contour of the control disk 80 and is thereby coupled thereto. As a result, due to the rotational movement of the first planetary carrier 621*a* relative to the blocked control disk 80, the second blocking pawl 6211 is forced into a pivoting movement, which is defined by the shaping of the control bean in the control disk 80 and during which the control disk 80 engages in the internal toothing 71 of the web 7, through which the first planetary carrier 621*a* extends. By means of this engagement of the second blocking pawl 6211, the first planetary carrier 621*a* is then blocked in the extension direction of the safety belt and the rotational direction-reversed rotational movement of the first planetary carrier 621*a* is ended.

Subsequently, the blocked first planetary carrier 621*a* forms a thrust bearing fixed to the vehicle, and the housing 60 and/or the belt shaft 5 are now driven with a higher torque in the winding direction by the electric motor 4 by activating the planetary gear 62 with a rotational speed that is translated into a lower rotational speed. As a result, the safety belt is subsequently tensioned with an increased tensioning force of, for example, 1000 N, and further belt slack is eliminated from the safety belt. In this case, the planetary gear 62 is driven via the gear shaft 624, without the unlocking ring 611 or the carrier part 612 being entrained due to the second pawls 633 of the drive wheel 63 overratcheting with respect to the internal toothing 617 and the parking pawls 629 of the carrier part 612 overratcheting with respect to the second toothing 627 of the gear shaft 624. Furthermore, due to the step-down of the planetary gear 62, the gear shaft 624 rotates faster than the belt shaft 5 and thus faster than the housing 60, which is made possible by the gear shaft 624 being able to rotate freely with respect to the unlocking ring 611 (central illustration of FIG. 11) and, at the same time, being able to rotate by means of the overratcheting of the parking pawls 629 with respect to the carrier part 612 (left illustration of FIG. 11). Since the carrier part 612 is blocked with respect to the housing 60 via the blocking elements 613, the carrier part 612 rotates together with the housing 60 at the same rotational speed and can simultaneously carry out a rotational movement relative to the gear shaft 624 by means of the overratcheting of the parking pawls 629.

In a further function, the belt retractor, with the cooperation of the electric motor 4, operates as a controlled force limiter, which enables a force-limited extension of the safety belt to reduce the load on the occupant in a forward displacement phase of the occupant in an accident, following the reversible tensioning. For this purpose, the belt retractor has the force-limiting unit 61, the operating principle of which is explained in more detail below with reference to FIGS. 11 to 13. FIG. 11 shows the position of the interacting parts of the force-limiting unit 61 before the activation of the controlled force limiter, that is to say, for example, also during the reversible belt tensioning, the winding into the parking position (winding aid) or even during the belt reminder function, which is explained below. The unlocking ring 611 is located in a rotation angle position in which it radially supports the blocking elements 613 by means of the ramps 6161 of the control contour 616 in particular by planar or circular-ring-section-shaped portions in the end portions of the ramps 6161 and thereby pushes them into a radially extended blocking position.

On its inside, the housing 60 has a structure consisting of two ramps 602 and 604, which rise in opposite directions in the circumferential direction and each have a different angle of incline and a web 605 which is arranged therebetween, extends in the axial direction and has a planar or circular-ring-section-shaped surface. The unlocking ring 611 is arranged such that it comprises the webs 605 with the cutouts 6111, wherein the cutouts 6111 are dimensioned slightly larger in the circumferential direction than the webs 605 so that the unlocking ring 611 can carry out slight rotational movements relative to the housing 60 in relation to the axis of rotation of the belt retractor or the belt shaft 5. In this case, the webs 605 are deliberately designed to be longer than the two ramps 602 and 604 in the axial direction so that the unlocking ring 611 comprises the webs 605 in one plane, and the blocking elements 613 displaceably guided in the laterally arranged carrier part 612 are arranged in an axially adjacent plane to the unlocking ring 611. Furthermore, the blocking elements 613 are supported radially inward on the ramps 6161 of the control contour 616 on the axially projecting annular flange of the unlocking ring 611. As a result, the blocking elements 613 lie in the circumferential direction on the steeper ramps 604 of the housing 60 and thereby connect the carrier part 612 in the illustration of FIG. 11 in the clockwise direction, thus in the retraction direction of the safety belt, to the housing 60. The carrier part 612 is thereby blocked in a clockwise direction with respect to the housing 60 via the blocking elements 613, which abut laterally against the steeper ramps 604.

Starting from this initial position, the locking unit 8 is activated before the start of the controlled, force-limited belt extension, and the lever of the actuator 82 subsequently engages in the toothing of the control disk 80, and the control disk 80 is blocked in the belt extension direction. Subsequently, the electric motor 4 is actuated such that it drives the drive wheel 63 in the extension direction of the belt. As a result, the control disk 80 is also driven in the extension direction and the second blocking pawl 6211 is forced into an actuating movement into the internal toothing 71 of the web 7 which is fixed to the housing, as a result of which the first planetary carrier 621a is blocked in the extension direction of the safety belt. Furthermore, the unlocking ring 611 is also driven in the extension direction via the radially outer second pawls 633 mounted on the drive wheel 63. As a result, the unlocking ring 611 is rotated relative to the carrier part 612 to the extent that the blocking elements 613 lose their support radially inward via the ramps 6161 of the control contour 616. Simultaneously, significant tensile forces in the safety belt already act in the safety belt in this early phase of the forward displacement or after a reversible or irreversible belt tensioning, which tensile forces, in a first step, cause the belt shaft 5 to rotate together with the gear mechanism 6 in a very short rotation angle in the extension direction, as a result of which the second blocking pawl 6211 on the first planetary carrier 621a is additionally forced to the actuating movement into the toothing 71 due to the blocked control disk 80 and blocks the first planetary carrier 621a with respect to the frame 1 of the belt retractor if the blocking is not yet completely concluded due to the preceding drive of the control disk 80 via the electric motor 4. In this case, the belt shaft 5 rotates until the second blocking pawl 6211 is locked without the unlocking ring 611 rotating relative to the gear mechanism housing 60. After the blocking of the first planetary carrier 621a, the tensile force exerted by the safety belt leads to a force transmission into the planetary gear 62.

Due to the first planetary carrier 621a blocked via the second blocking pawl 6211, the first stage of the planetary gear 62 becomes a rotational direction reversing gear, and the belt shaft 5, together with the housing 60 of the gear mechanism 6, under the action of tensile force, can only rotate further in the extension direction of the safety belt in that the first planet gears 622a no longer circulate but instead only rotate about their axes of rotation and transmit the rotational movement to the further planetary stages in the reverse rotational direction. If preceded by a reversible belt tensioning movement, which is to be assumed in the event of an accident, the first planetary carrier 621a is already blocked due to the preceding tensioning movement described above, and the described blocking process for activating the force-limited belt extension movement is omitted, or the first planetary carrier 621a is already blocked at the beginning of the activation of the electric motor 4 for the controlled force-limited belt extension. By blocking the first planetary carrier 621a, the rotational speed of the belt shaft 5 and of the housing 60 is translated into a faster rotational movement due to the transmission ratio and is finally transmitted to the carrier part 612, on which the third planet gears 622c of the last planetary stage are mounted and the blocking elements 613 are displaceably guided. In the planetary gear 62 thus ensues a reaction torque which is caused by the tension in the belt, acts on the carrier part 612 in the direction of the arrow and acts on the blocking elements 613 in the circumferential direction. Since the blocking elements 613 are no longer supported radially inward by the control contour 616, they slide off at the ramps 604 of the housing 60 and thereby perform a forced movement directed radially inward, during which they dip into the recesses 6162 of the control contour 616. As a result, the blocking of the carrier part 612 relative to the housing 60 in the circumferential direction is canceled and the carrier part 612 can rotate by a small angle, in this case with four blocking elements 613 arranged at 90 degrees relative to one another, exactly by 90 degrees with respect to the housing 60. At the same time, the housing 60 can thus rotate the belt shaft 5 by a small rotation angle in the extension direction. These rotational movements are stopped again after these rotation angles in that the blocking elements 613 run up onto the ramps 6161 of the control contour 616 again, are supported radially inward by said ramps 6161, and are thereby pushed outward, wherein they enter radially outward a free space created by the very much flatter ramps 602 behind the webs 605, until they finally again come to rest against the steeper ramps 604 of the housing 60 in the circumferential direction and block the further rotational movement of the carrier part 612 with respect to the housing 60.

The blocking elements 613 here form the first blocking device, which enables the force-limited extension of the safety belt by means of its movement in a repeating process consisting of a release and blocking of the extension movement of the safety belt. In this case, upon being activated, the electric motor 4 serves to trigger or enable the movement of the first blocking device by driving the unlocking ring 611 with the control contour 616 provided thereon and thereby causing or enabling the release of the blocking elements 613 in connection with the acting tensile forces in the safety belt. In this case, the shape of the radial control contour 616 with the alternately arranged ramps 6161 and recesses 6162 is of particular importance since it forces or enables and controls the radial movement of the blocking elements 613, which is of particular importance for releasing and blocking the first blocking device. Furthermore, the planetary gear 62 is of particular importance here since the extension rotational movement of the belt shaft 5 is translated by the planetary gear 62 into a substantially faster rotational movement of the carrier part 612, which leads to the blocking path available for blocking the first blocking device being increased. Furthermore, the forces acting on the blocking elements 613 are also reduced as a result. Furthermore, it is advantageous for the gear mechanism 6 in the form of the planetary gear 62 to operate as a rotational direction reversing gear in this phase so that the carrier part 612 and the housing 60, between which the planetary gear 62 is arranged, carry out opposite rotational movements, and the relative movement required for blocking the first blocking device is further increased. Here, the housing 60, with the internal toothing 601, forms the first part of the rotational direction reversing gear, which is in a rotary connection with the belt shaft 5. Here, the carrier part 612 forms the second part of the rotational direction reversing gear according to the invention, which, relative to the housing 60, i.e., to the first part, is driven by the rotational direction reversing gear into a rotational movement oriented in the opposite direction, wherein the blocking elements 613. i.e., the first blocking device, are thus arranged between the first and the second part.

The housing 60 of the gear mechanism 6, in this case the first part, has a blocking contour formed by the steeper ramps 604, which block or stop further rotation of the carrier part 612 relative to the housing 60 when the blocking elements 613 abut.

Said first part is formed by the housing 60 in the form of a tubular axial extension, which is connected to the belt shaft 5 in a rotationally fixed manner and which simultaneously forms the housing 60 for the gear mechanism 6 in a second function. The housing 60 enfolds the gear mechanism 6 toward the outside and thus protects the latter from external influences. In addition, in a compact design, the housing 60 forms the blocking structure for the blocking elements 613 on its radially inner side.

The force-limiting characteristic can furthermore be influenced by the unlocking ring 611 being driven at an increased rotational speed. As a result, the unlocking ring 611 with the control contour 616 follows the gear mechanism housing 60 rotating in the extension direction, whereby in turn the number of blockages of the blocking elements 613 in relation to a revolution of the gear mechanism housing 60 can be reduced. In extreme cases, it is even possible to drive the unlocking ring 611 with a rotational speed corresponding to the rotational speed of the gear mechanism housing 60 in the extension direction, and to hold the unlocking ring 611 in the process in a rotation angle position with respect to the gear mechanism housing 60, in which position the ramps 6161 of the control contour 616 are oriented during circulation at a rotation angle between two ramps 602 and 604 of different webs 605 of the gear mechanism housing 60, so that when traveling over the ramps 6161 of the control contour 616, the blocking elements 613 do not block when they come to rest on the ramps 604 and can practically circulate without blocking. The unlocking ring 611 is thereby held in an "open position" relative to the gear mechanism housing 60, and the blocking of the carrier part 612 relative to the gear mechanism housing 60 is prevented. In this way, a maximally fast belt extension with as low a force limitation as possible can be realized, wherein the force limitation is brought about solely by the friction-related energy destruction in the gear mechanism 6.

The spring 615 is designed such that its spring force is significantly greater than the spring force of the mainspring 91. As a result, a comfort function can additionally be realized in that the electric motor 4 drives the belt shaft 5 directly in the winding or unwinding direction via the unlocking ring 611, the spring 615, the housing 60, and thereby increases or reduces the retraction force acting on the belt shaft 5. In this case, the planetary gear 62 is bridged by the force transmission via the spring 615. This applies to the transmission of very small torques and corresponding rotational speeds, in which the inner first pawls 632 do not engage with the third toothing 626 of the gear shaft 624 so that the gear shaft 624 is not driven. If the housing 60 is additionally connected in the circumferential direction via the spring-loaded blocking parts 64 to the first planetary carrier 621a, this leads, in addition to the possible stiffness of the planetary gear 62, to a blockage of the planetary gear 62, and to the transmission of the rotational movement of the electric motor 4 in a ratio of 1:1 to the belt shaft 5.

Figure 14:
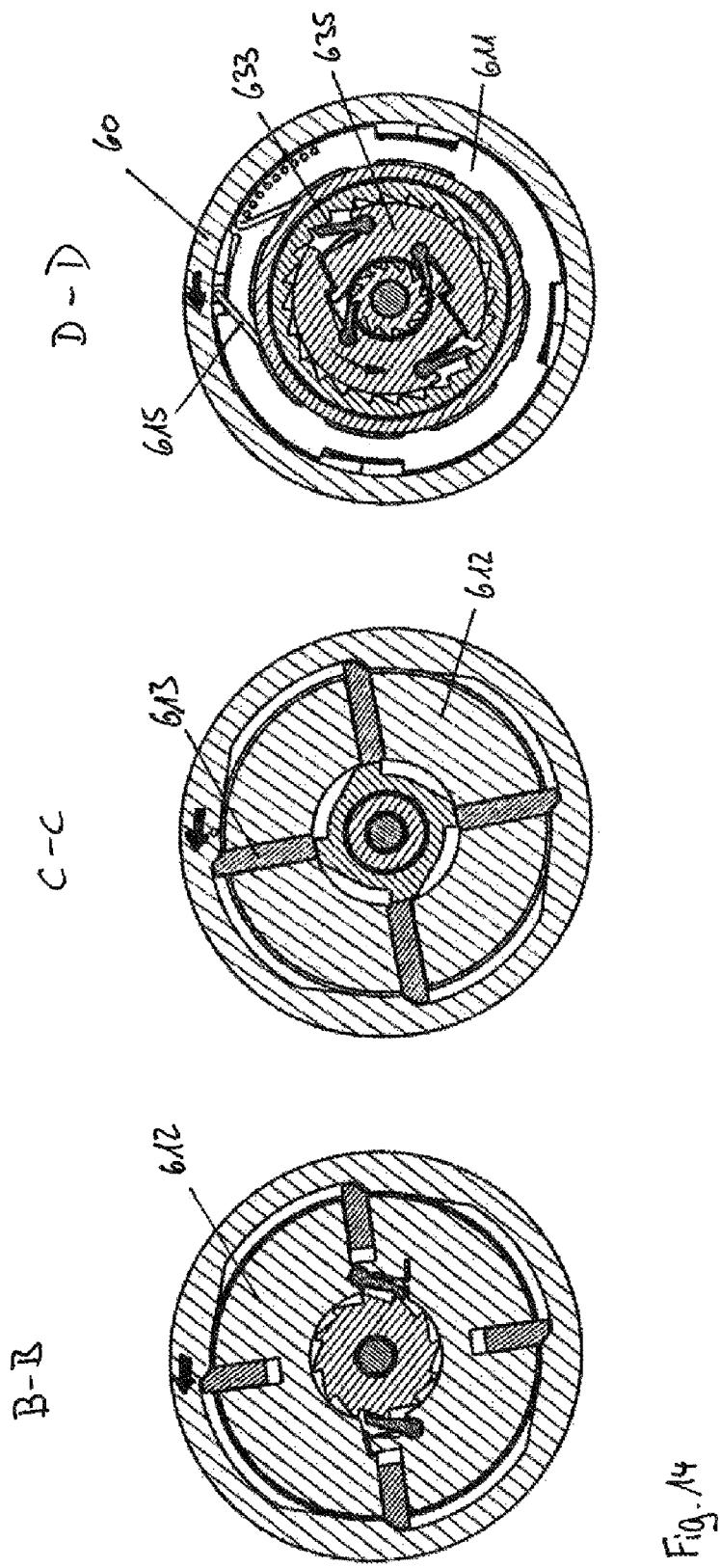

In a further function, the electric motor 4 is used to excite the belt to a vibration that is clearly perceptible to the occupant (belt reminder, or also "haptic warning"). In FIG. 14, three sectional views of the belt retractor during the execution of the belt reminder function can be seen. During the execution of the belt reminder function, the electric motor 4 drives the drive wheel 63 in the extension direction in an identical manner to the controlled force-limited belt extension, the difference being that no tensile force acts in the safety belt at this point in time. The consequence of this is that the unlocking ring 611 is entrained in the extension direction via the pawls 633 of the drive wheel 63. This rotational movement of the unlocking ring 611 is transmitted via the spring 615 to the belt shaft 5, wherein the carrier part 612 and the entire gear mechanism 6 are entrained by the blocking elements 613 as an assembly due to the lack of tensile force in the safety belt. The electric motor 4 rotates to such an extent that approximately 5 to 10 mm of belt length is fed out until the energizing of the electric motor 4 is interrupted. In this case, the electric motor 4 is energized in a pulsed manner, i.e., the energizing is interrupted at regular intervals. When the energizing of the electric motor 4 is interrupted, no forces act on the belt shaft 5 in the belt extension direction so that the belt shaft 5 is retracted again in the winding direction by the spring force of the mainspring 91 in the spring cassette 9 before the process is repeated. The safety belt resting against the occupant is thereby excited to a vibration without the belt force exerted on the occupant by the safety belt being increased. In this case, the occupant only takes the belt reminder as a "jiggling" of the belt was. The belt extension length fed out in this case, or also the frequency of the "jiggling," can be set by the duration of the energizing and the duration of the interruption of the current supply. Since the mainspring 91 is present anyway, the electric motor 4 can be used here for a further function without additional costs.

Simultaneously to the activation of the electric motor 4, the actuator 82 can be energized so that it engages with the lever in the toothing of the control disk 80. The consequence of this is that the second blocking pawl 6211 is extended during the activation of the electric motor 4 and a drive of the belt shaft 5 in the extension direction and is directed into the toothing 71 of the web 7. As a result, the feed-out movement of the safety belt during the activation of the belt reminder function is limited to the length of the locking path, and the safety belt is not endlessly released under any circumstances. This blocking can then be canceled again when the mainspring 91 subsequently drives the belt shaft 5 again in the winding direction.

Figure 15:
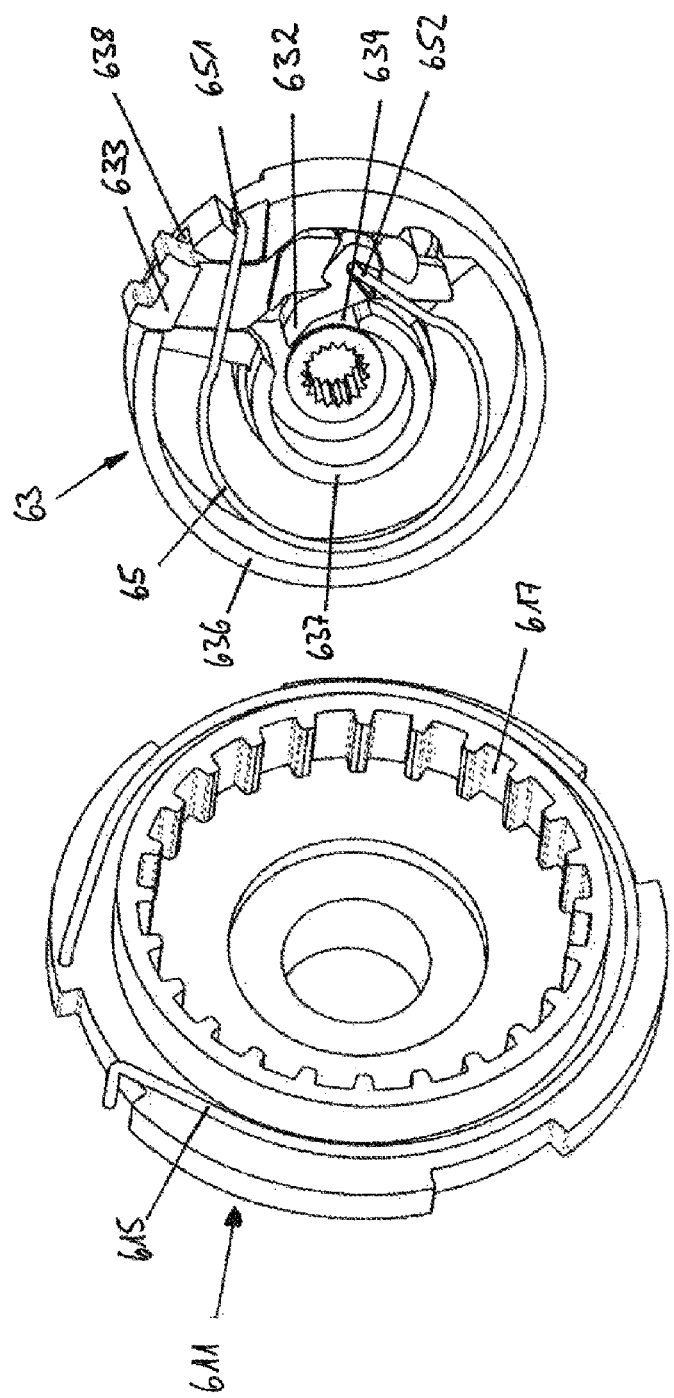
Figure 16:
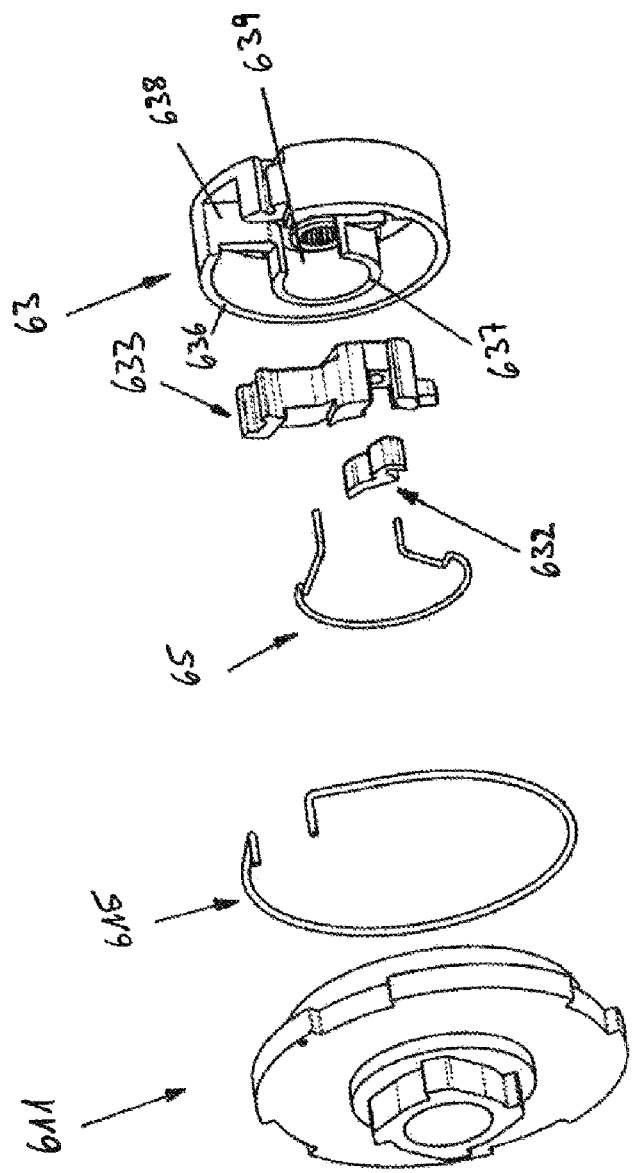

FIGS. 15 and 16 show the drive wheel 63 with the unlocking ring 611 according to a second embodiment. The drive wheel 63 has two axially projecting annular projections 636 and 637 that are concentric with the axial opening with the internal toothing 631 and which, in a segment in each case, are interrupted to form an opening 638 and 639. Furthermore, a first and a second pawl 632 and 633 are provided, which bear against one another and are pretensioned via a single annular spring 65. The annular spring 65 is fixed with its outer first end 651 on the drive wheel 63 in the circumferential direction and is mounted with its inner second end 652 in a pocket on the inner first pawl 632. The annular spring 65 is designed such that it loads the two abutting first and second pawls 632 and 633 in the relaxed state in such a way that the inner first pawl 632 with its blocking tip is in front of the opening 639 of the inner annular projection 637 and does not engage in the third toothing 626 of the gear shaft 624 to be considered, while the outer second pawl 633 projects radially outward through the opening 638 of the radially outer annular projection 636, as can be seen in the right-hand representation of FIG. 15, and engages in the internal toothing 617 of the unlocking ring 611 to be considered. However, the functionality would also not be disadvantaged if the inner first pawl 632 were to engage in the third toothing 626, since the engagement is irrelevant for this function.

Figure 5:
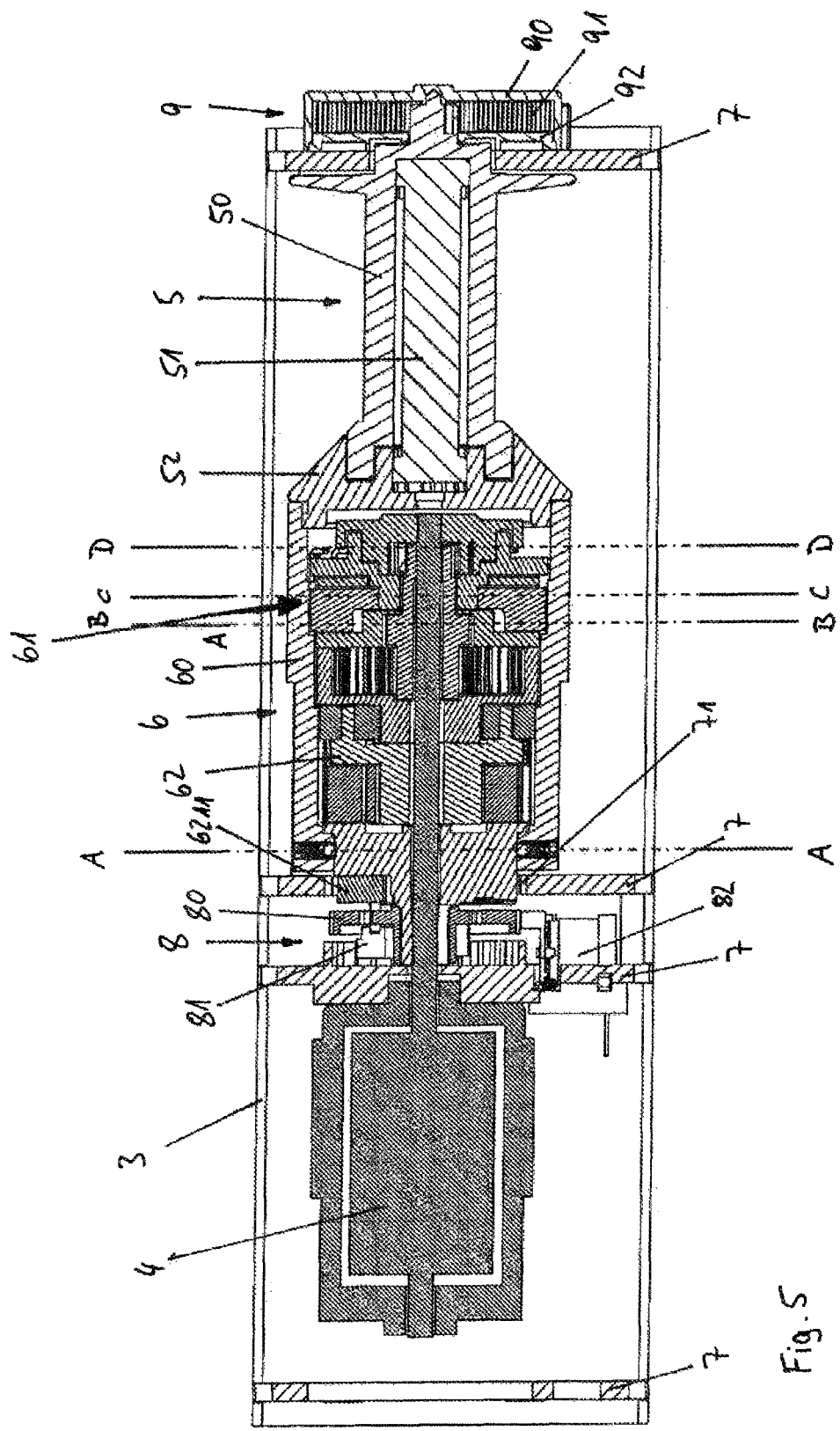
Figure 17:
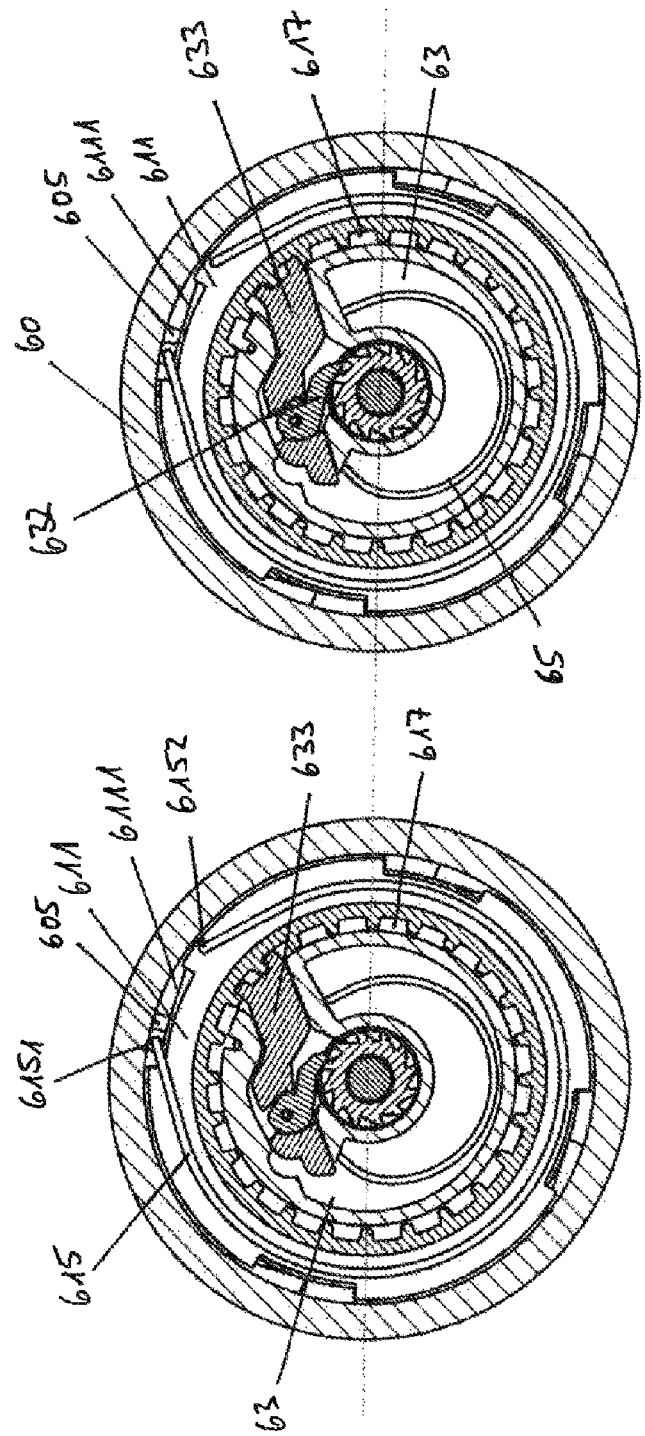

FIG. 17 shows the belt retractor with the drive wheel 63 according to the second exemplary embodiment according to FIGS. 15 and 16 in the sectional direction D-D of FIGS. 5 and 9. The outer second pawl 633 is pushed by the annular spring 65 of the drive wheel 63 into a radially outer position in which it engages with its teeth in the internal toothing 617 of the unlocking ring 611 and, apart from a slight play, produces thereby a rotationally fixed connection between the drive wheel 63 and the unlocking ring 611 until a predetermined torque and a predetermined rotational speed of the electric motor 4 are exceeded. Since the spring 615 acting between the unlocking ring 611 and the housing 60 has a significantly higher spring force than the mainspring 91, the belt shaft 5 can thus be driven via the second pawl 633, the unlocking ring 611 and finally the spring 615 both in the winding direction and in the unwinding direction to reduce or increase the retraction force acting on the belt shaft 5. (Comfort function) Furthermore, after unbuckling, the safety belt can thereby be wound up into the parking position (belt parking) with an increased retraction force. In principle, the torque can be transmitted solely via the spring 615. If necessary, however, the transmittable torque can also alternatively or additionally be increased by a lateral form-fitting abutment of the radial webs of the unlocking ring 611 bounding the cutouts 6111, on the webs 605 of the housing 60. The rotary connection created in this way makes it possible to dispense with the rotary connection created via the blocking parts 64 of the first exemplary embodiment (see FIG. 10).

Figure 18:
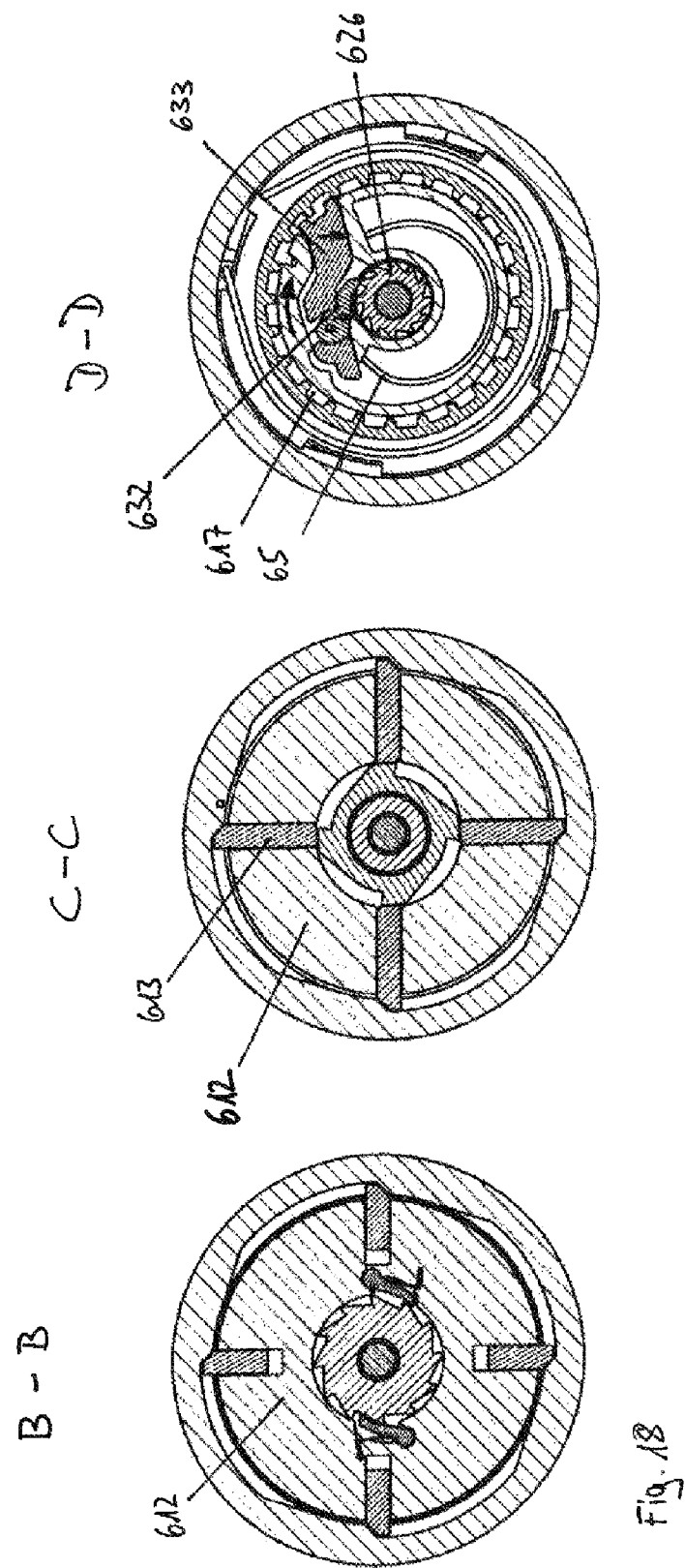
Figure 19:
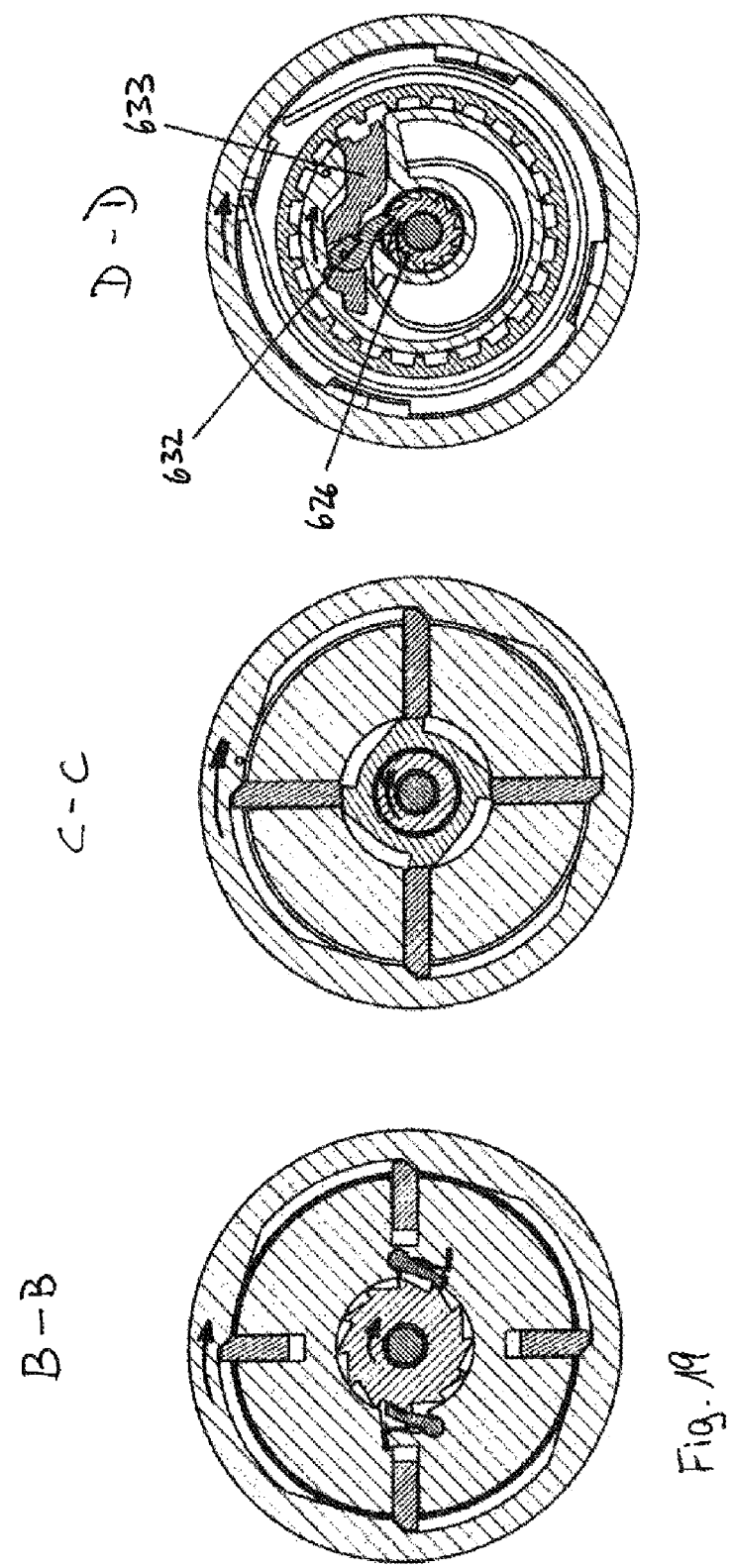

FIGS. 18 and 19 show the belt retractor with a drive wheel 63 according to the second exemplary embodiment in an initial phase and a later phase of the reversible belt tensioning. Starting from the position of the two pawls 632 and 633 shown in FIG. 17 prior to activation of the electric motor 4, when the electric motor 4 is activated for a reversible belt tensioning, inertia causes the pawls 632 and 633 to be pivoted radially inward counter to the spring force of the annular spring 65 due to the high torque and the much higher rotational speed. In this case, the radially outer second pawl 633 disengages from the internal toothing 617 of the unlocking ring 611 and the radially inner first pawl 632 engages in the third toothing 626 of the gear shaft 624. Due to the engagement of the inner first pawl 632 in the third toothing 626 of the gear shaft 624 and the simultaneous disengaging of the second pawl 633, a rotary connection is created between the drive wheel 63 and the gear shaft 624, while the rotary connection between the drive wheel 63 and the unlocking ring 611 is simultaneously canceled. Subsequently, the electric motor 4 drives the gear shaft 624 via the drive wheel 63 in the winding direction, as can be seen in FIG. 19, and the belt shaft 5 is driven according to the same principle as the movement sequence of the planetary gear 62, which is described with respect to the first exemplary embodiment according to FIG. 11, in the winding direction with a rotational speed that is stepped down to a lower rotational speed, but with a higher torque.

Figure 12:
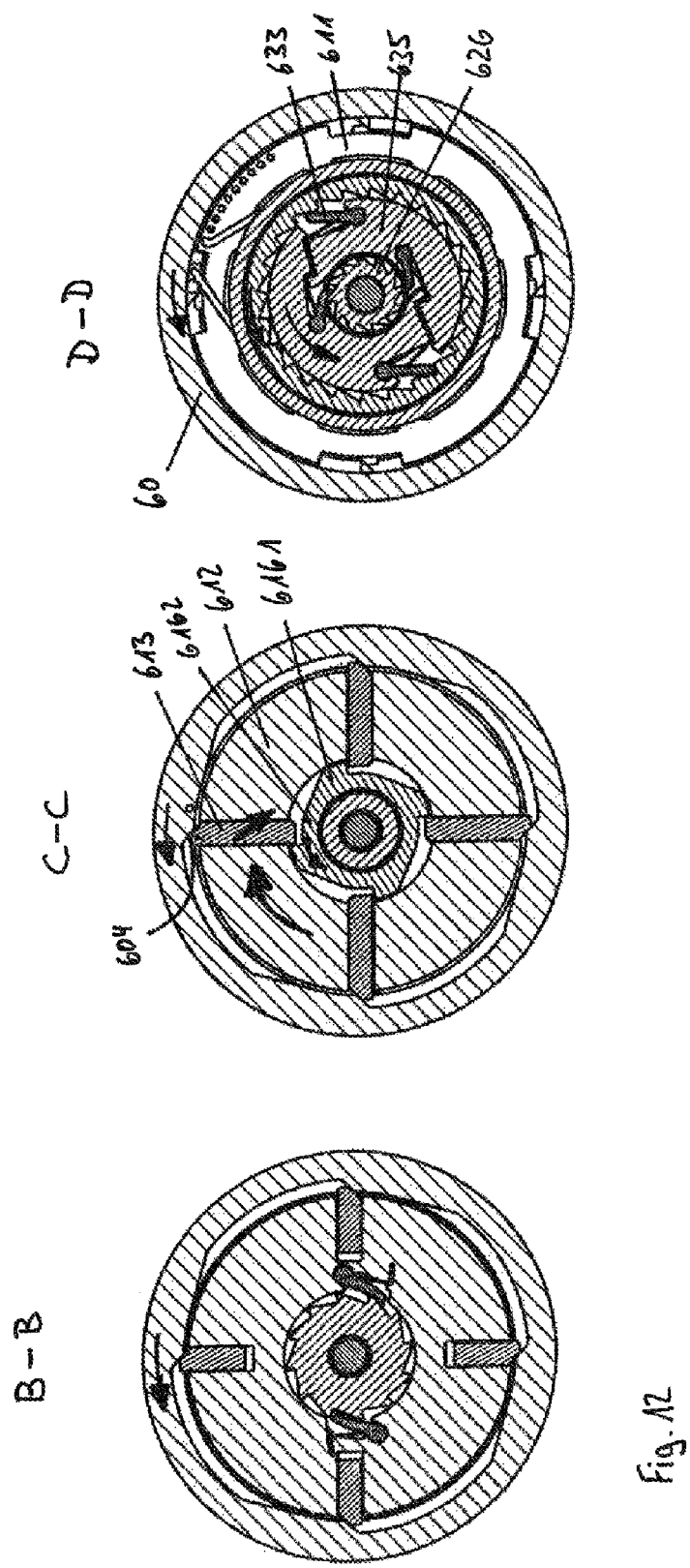
Figure 13:
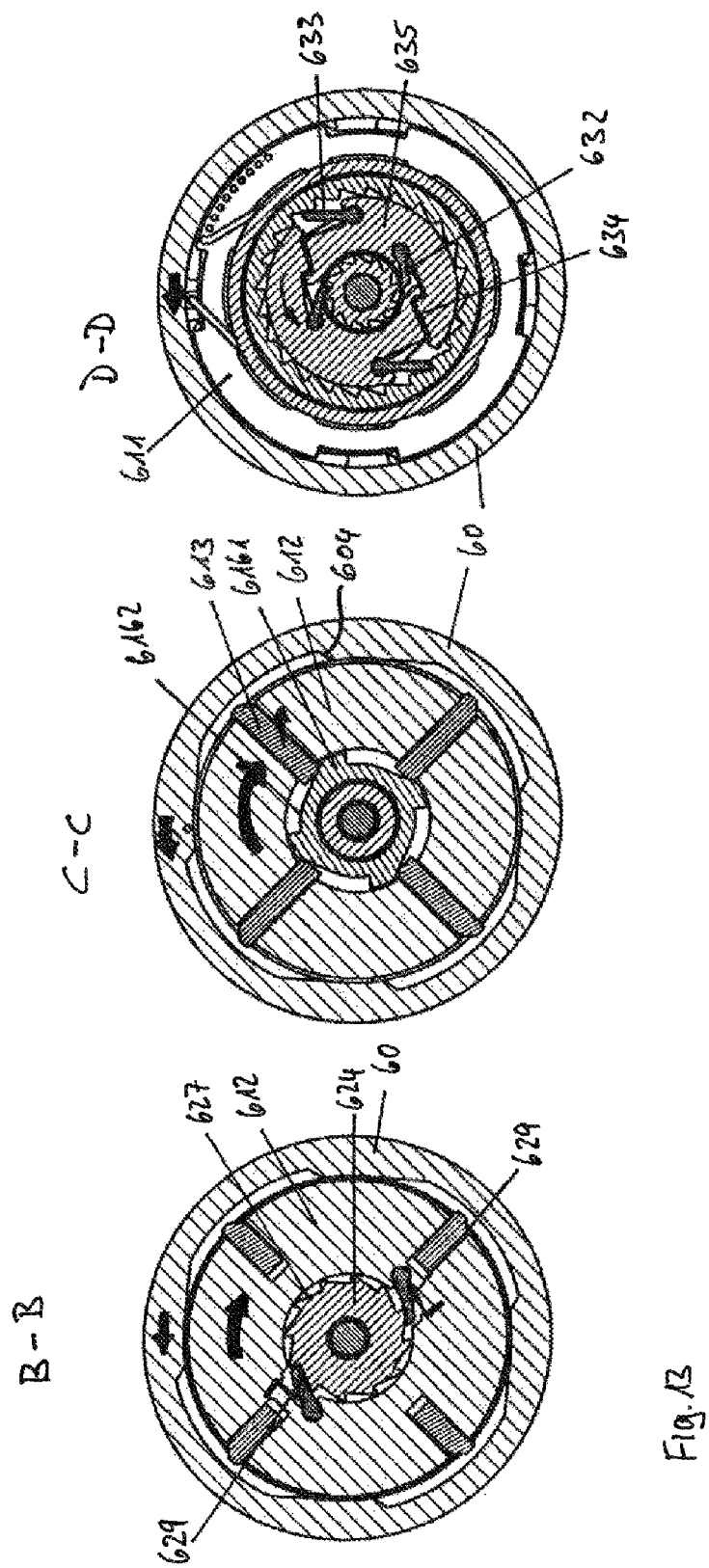
Figure 20:
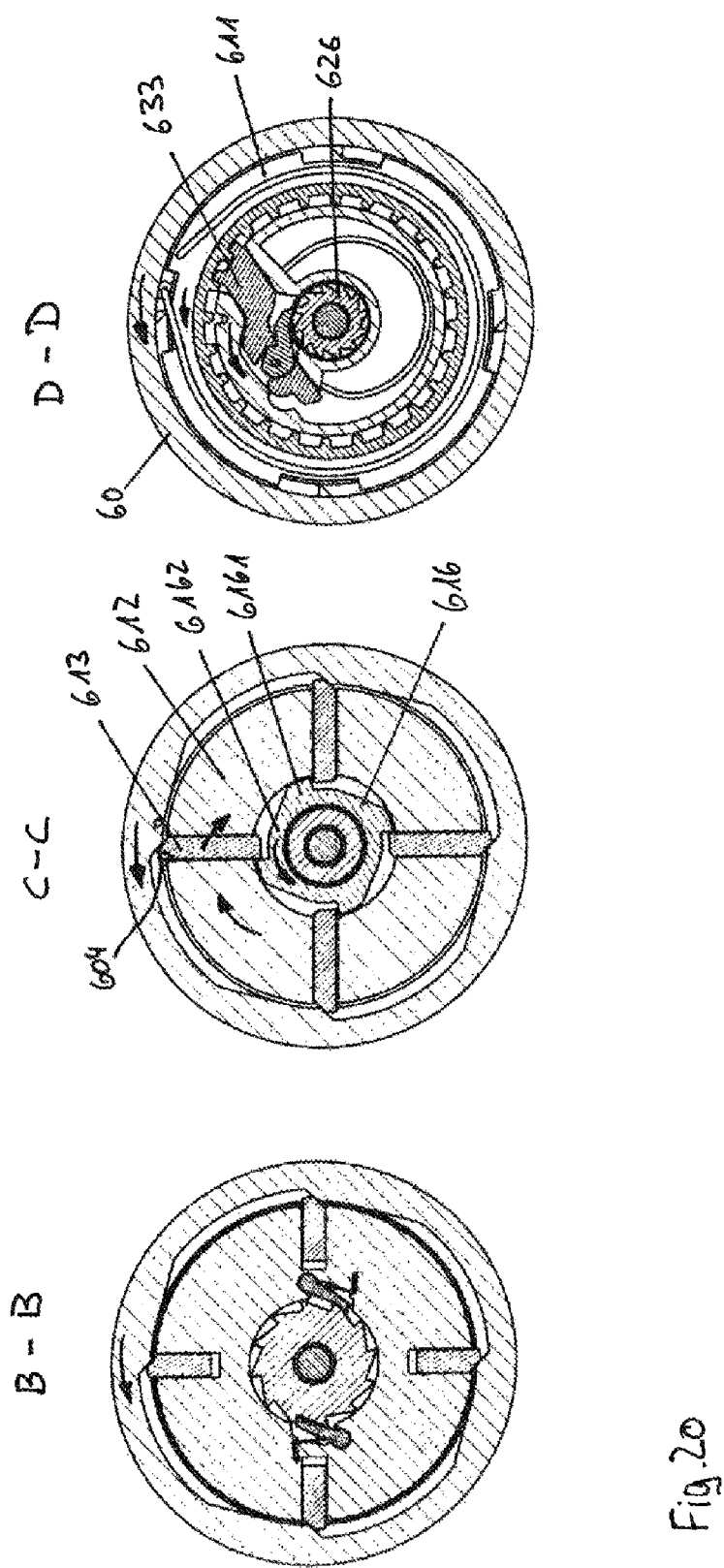
Figure 21:
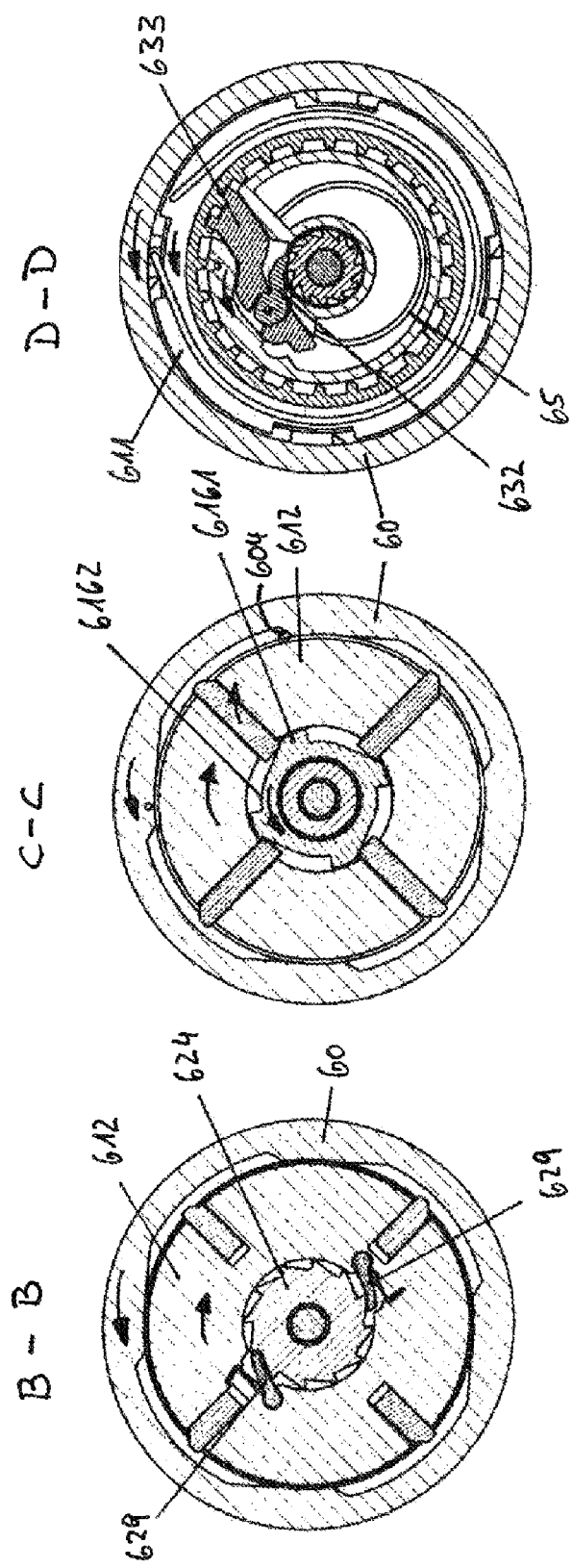

In FIGS. 20 and 21, the belt retractor can be seen functioning as an electronic force limiter with the drive wheel 63 according to the second exemplary embodiment, wherein the movement sequence and the force-limited belt extension take place according to the same movement sequence as has already been described for FIGS. 12 and 13. In this respect, reference is made to the description there.

Here too, the electric motor 4 drives the unlocking ring 611 via the radially outer second pawl 633 in the extension direction of the safety belt so that the blocking elements 613 lose their support on the control contour 616 and are thereby pushed radially inward from the blocking position, and the force-limited belt extension movement is made possible.

Figure 22:
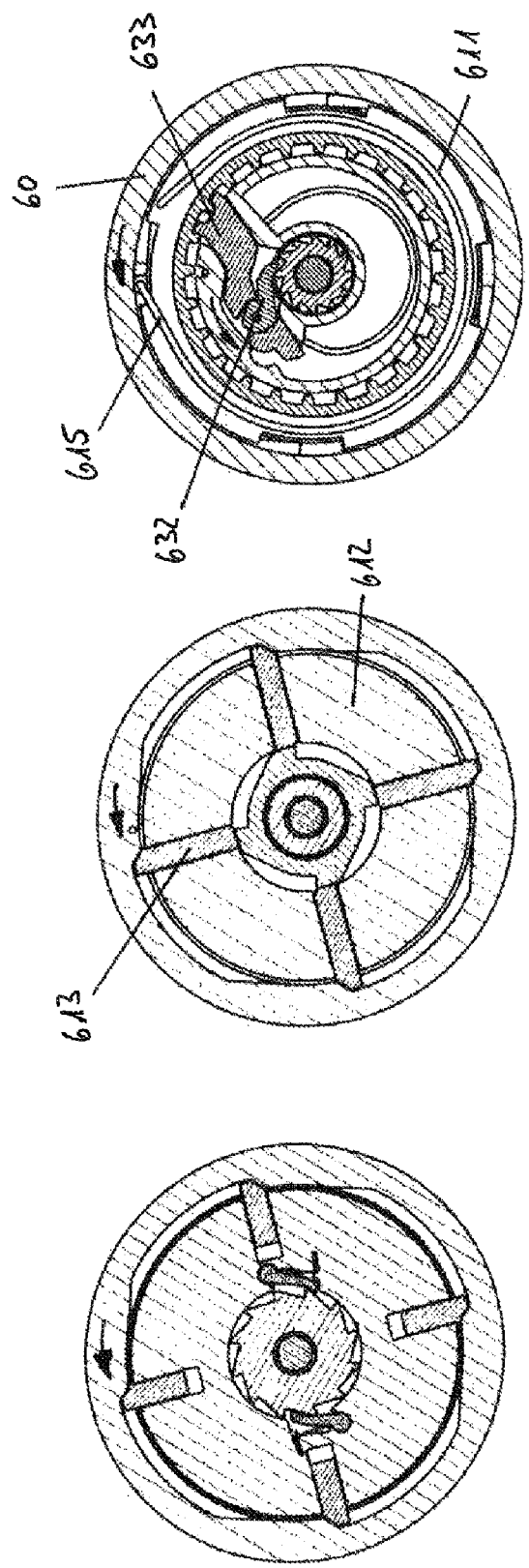

In FIG. 22, the belt retractor can be seen functioning as a belt reminder, wherein the movement sequence is in turn identical to the movement sequence described for FIG. 14, and the drive wheel 63 is provided according to FIG. 15.

The belt retractor can be provided with the described force-limiting unit 61 as a single function. However, it is also conceivable to provide the belt retractor with some or all described additional functions, such as a reversible belt tensioner, a winding aid, a comfort function for reducing or increasing the retraction force or a belt reminder, which can be realized as described, when using a single electric motor 4.

The invention claimed is:

1. A belt retractor comprising:
   a belt shaft, which is rotatably mounted in a frame and on which a safety belt can be wound, and
   a force-limiting unit, which, when activated, enables a rotational movement of the belt shaft in the extension direction of the safety belt,
   wherein
   the force-limiting unit has an electric motor and a first blocking device, which are both arranged in a rotational axis, and
   the first blocking device is configured to release and block again the rotational movement of the belt shaft in the extension direction in a repeating sequence by controlling an activation of the electric motor.

2. The belt retractor according to claim 1, wherein
   the first blocking device can be moved as a function of the activation of the electric motor from a position blocking the belt shaft into a position releasing the belt shaft, and
   the first blocking device automatically blocks again after a predetermined rotation angle of the belt shaft as a result of the enabled rotational movement of the belt shaft in the extension direction.

3. The belt retractor according to claim 2, wherein
   an unlocking ring is provided which is driven by the electric motor and has a control contour, and
   the first blocking device is formed by at least one blocking element that abuts against the control contour.

4. The belt retractor according to claim 3, wherein
   the control contour is formed by a ramp structure, which has a number of ramps corresponding to the number of blocking elements, and by recesses which are arranged between the ramps and against which the blocking element alternately abuts in the blocking position and the releasing position.

5. The belt retractor according to claim 3, wherein the unlocking ring is spring-loaded by a spring with respect to the belt shaft.

6. The belt retractor according to claim 5, wherein
   the belt shaft is spring-loaded in the winding direction of the safety belt by a mainspring which is fixedly supported on the frame, and
   the spring force of the mainspring is smaller than the spring force of the spring loading the unlocking ring.

7. The belt retractor according to claim 1, wherein
a rotational direction reversing gear is provided which is rotationally connected via a first part to the belt shaft, and
the first blocking device is arranged between the first part of the rotational direction reversing gear and a second part of the rotational direction reversing gear, which second part is driven by the rotational direction reversing gear into a rotational direction counter to the rotational direction of the belt shaft.

8. The belt retractor according to claim 7, wherein
with respect to the first part, the second part performs a rotational movement translated by the rotational direction reversing gear into a higher rotational speed.

9. The belt retractor according to claim 7, wherein
the rotational direction reversing gear is formed by a planetary gear, and that
the reversal of the rotational direction in the rotational direction reversing gear is realized by a first planetary carrier of the planetary gear, which planetary carrier is blocked by a second blocking device with respect to the frame of the belt retractor.

10. The belt retractor according to claim 7, wherein
the first part or the second part of the rotational direction reversing gear has a blocking contour, against which the first blocking device rests in the blocking position.

11. The belt retractor according to claim 10, wherein
the blocking contour is formed by ramps which are oriented in the circumferential direction, are arranged on the inside of the annular extension, and against which the blocking element abuts in the blocking position.

12. The belt retractor according to claim 7, wherein
the first part is formed by a tubular, axial extension, which is connected to the belt shaft in a rotationally fixed manner and forms the housing of the rotational direction reversing gear.

13. A belt retractor comprising:
a belt shaft, which is rotatably mounted in a frame and on which a safety belt can be wound, and
a force-limiting unit, which, when activated, enables a rotational movement of the belt shaft in the extension direction of the safety belt,
wherein
the force-limiting unit has an electric motor and a first blocking device,
the first blocking device is configured to release and block again the rotational movement of the belt shaft in the extension direction in a repeating sequence by controlling the activation of the electric motor,
the first blocking device can be moved as a function of the activation of the electric motor from a position blocking the belt shaft into a position releasing the belt shaft,
the first blocking device automatically blocks again after a predetermined rotation angle of the belt shaft as a result of the enabled rotational movement of the belt shaft in the extension direction,
an unlocking ring is provided which is driven by the electric motor and has a control contour, and
the first blocking device is formed by at least one blocking element that abuts against the control contour.

* * * * *